United States Patent
Mizuno et al.

(10) Patent No.: US 10,283,749 B2
(45) Date of Patent: May 7, 2019

(54) LAMINATED POLYOLEFIN MICROPOROUS MEMBRANE, BATTERY SEPARATOR, AND PRODUCTION METHOD THEREOF

(71) Applicant: TORAY INDUSTRIES, INC., Tokyo (JP)

(72) Inventors: Naoki Mizuno, Tochigi (JP); Masami Sugata, Tochigi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/517,492

(22) PCT Filed: Oct. 5, 2016

(86) PCT No.: PCT/JP2016/079663
§ 371 (c)(1),
(2) Date: Apr. 6, 2017

(87) PCT Pub. No.: WO2017/061489
PCT Pub. Date: Apr. 13, 2017

(65) Prior Publication Data
US 2017/0309883 A1    Oct. 26, 2017

(30) Foreign Application Priority Data

Oct. 9, 2015    (JP) .................................. 2015-201069

(51) Int. Cl.
*H01M 2/16* (2006.01)
*B32B 27/32* (2006.01)
(Continued)

(52) U.S. Cl.
CPC ....... *H01M 2/1686* (2013.01); *B29C 47/0021* (2013.01); *B29C 47/0057* (2013.01);
(Continued)

(58) Field of Classification Search
None
See application file for complete search history.

(56) References Cited

U.S. PATENT DOCUMENTS 5,691,047 A * 11/1997 Kurauchi ................ B32B 27/32
                                                      428/315.7
2004/0096744 A1* 5/2004 Sadamitsu ............ B29C 55/005
                                                      429/254
(Continued)

FOREIGN PATENT DOCUMENTS

JP    2007-273443 A    10/2007
JP    2008-149895 A    7/2008
(Continued)

OTHER PUBLICATIONS

International Search Report and Written Opinion of PCT/JP2016/079663 dated Oct. 1, 2017, all pages.

*Primary Examiner* — Alix E Eggerding
(74) *Attorney, Agent, or Firm* — Kilpatrick Townsend & Stockton LLP

(57) ABSTRACT

A laminated polyolefin microporous membrane is disclosed. The laminated polyolefin microporous membrane includes a first polyolefin microporous membrane, and a second polyolefin microporous membrane. A shutdown temperature of the laminated polyolefin microporous membrane is from 128° C. to 135° C., an air permeation resistance increase rate from 30° C. to 105° C. per 20 μm of thickness of the laminated polyolefin microporous membrane is less than 1.5 sec/100 cc Air/° C., and a variation range in an F25 value of the laminated polyolefin microporous membrane in a longitudinal direction is not greater than 1 MPa. The F25 value represents a value determined by dividing the load at 25% elongation of a sample of the laminated polyolefin micropo- (Continued)

rous membrane as measured with a tensile tester by the cross-sectional area of the sample polyolefin microporous membrane.

12 Claims, 6 Drawing Sheets

(51) Int. Cl.
  *B29C 47/00* (2006.01)
  *B29C 47/88* (2006.01)
  *H01M 2/14* (2006.01)
  *B32B 27/08* (2006.01)
  *B29K 623/00* (2006.01)
  *B29L 31/34* (2006.01)
  *B29L 31/00* (2006.01)

(52) U.S. Cl.
  CPC .......... *B29C 47/8805* (2013.01); *B32B 27/08* (2013.01); *B32B 27/32* (2013.01); *H01M 2/145* (2013.01); *H01M 2/16* (2013.01); *H01M 2/1653* (2013.01); *B29K 2623/065* (2013.01); *B29L 2031/3468* (2013.01); *B29L 2031/755* (2013.01); *B32B 2250/02* (2013.01); *B32B 2250/242* (2013.01); *B32B 2255/10* (2013.01); *B32B 2255/26* (2013.01); *B32B 2307/30* (2013.01); *B32B 2307/724* (2013.01); *B32B 2457/10* (2013.01)

(56) References Cited

U.S. PATENT DOCUMENTS

| 2010/0151325 | A1* | 6/2010 | Kasamatsu | H01M 2/1653 429/223 |
| 2014/0370358 | A1* | 12/2014 | Hong | H01M 10/052 429/126 |

FOREIGN PATENT DOCUMENTS

| JP | 2008-186721 A | 8/2008 |
| JP | 2009-026733 A | 2/2009 |
| JP | 2009-205955 A | 9/2009 |
| JP | 2010-092882 A | 4/2010 |
| JP | 2010-108753 A | 5/2010 |
| JP | 2011-23186 A | 2/2011 |
| JP | 2011-181195 A | 9/2011 |
| JP | 2012-500130 A | 1/2012 |
| JP | 2012-020437 A | 2/2012 |
| JP | 2012-521914 A | 9/2012 |
| JP | 5914790 B1 | 5/2013 |
| JP | 2013-530261 A | 7/2013 |
| JP | 5914789 B1 | 5/2016 |
| WO | 2007/046226 A1 | 4/2007 |
| WO | 2013/080701 A1 | 6/2013 |

* cited by examiner

LAMINATED POLYOLEFIN MICROPOROUS MEMBRANE, BATTERY SEPARATOR, AND PRODUCTION METHOD THEREOF

CROSS-REFERENCE TO RELATED APPLICATIONS

This application is a United States National Phase Application of co-pending International Patent Application Number PCT/US2016/079663, filed Oct 10, 2016 and entitled "LAMINATED POLYOLEFIN MICROPOROUS MEMBRANE, BATTERY SEPARATOR, AND PRODUCTION METHOD THEREOF," which Application claims priority to Japanese Patent Application Number 2015-201069, filed with the Japanese Patent Office on Oct. 9, 2015, the contents of which are incorporated herein by reference in their entirety.

TECHNICAL FIELD

The present invention relates to a laminated polyolefin microporous membrane, a battery separator having a porous layer on one or more sides of a laminated polyolefin microporous membrane, and a production method thereof.

BACKGROUND ART

Thermoplastic resin microporous membranes are used widely as separation membranes, selective transmission membranes, isolation membranes, and the like for substances. For example, the usage includes battery separators used in lithium ion secondary batteries, nickel-hydrogen batteries, nickel-cadmium batteries, or polymer batteries, separators for electric double layer capacitors, and the like.

In particular, a polyethylene microporous membrane which exhibits ion permeability due to electrolytic solution impregnation, excellent electrical insulating properties, and a pore blocking function for blocking an electrical current to prevent an excessive temperature increase at a temperature of approximately 120 to 150° C. at the time of an abnormal temperature increase in a battery, is suitably used as a lithium ion secondary battery separator. However, if the internal temperature of the battery continues to increase even after pore blocking for some reason, the polyethylene microporous membrane may be punctured due to the shrinkage of the membrane. This phenomenon is not limited to polyethylene microporous membranes. Even in the case of a microporous membrane using another thermoplastic resin, this phenomenon cannot be avoided at a temperature equal to or above the melting point of the resin.

In particular, separators for lithium-ion batteries greatly affect battery characteristics, battery productivity and battery safety, and require mechanical properties, heat resistance, permeability, dimensional stability, shutdown characteristics, membrane melt-puncture characteristics (meltdown characteristics) and the like. In addition, they require improved adhesion to an electrode material for improvement in cycle characteristics of batteries and improved wettability toward electrolytic solution for productivity improvement. The notion of enhancing these functions by providing a porous layer on a microporous membrane has been investigated in the past.

Note that a porous layer described in this specification refers to a layer obtained by a wet coating method.

In Example 5 of Patent Document 1, a multilayer porous membrane having a total membrane thickness of 24 μm (coating thickness: 4 μm) is obtained by using a gravure coater to apply an aqueous solution in which titania particles and polyvinyl alcohol are uniformly dispersed to a polyethylene microporous membrane precursor obtained by a simultaneous biaxial stretching method, and then drying the product at 60° C. to remove water.

In Example 3 of Patent Document 2, a multilayer porous membrane having a total membrane thickness of 19 μm (coating thickness: 3 μm) is obtained by using a bar coater to apply an aqueous solution in which titania particles and polyvinyl alcohol are uniformly dispersed to a polyolefin microporous membrane obtained by a simultaneous biaxial stretching method, and then drying the product at 60° C. to remove water.

In Example 1 of Patent Document 3, a multilayer porous membrane having a total membrane thickness of 20 μm (coating thickness: 4 μm) is obtained by using a gravure coater to apply an aqueous solution in which aluminum particles and polyvinyl alcohol are uniformly dispersed to a polyolefin microporous membrane obtained by a simultaneous biaxial stretching method, and then drying the product at 60° C. to remove water.

In Example 6 in Patent Document 4, a polyethylene microporous membrane obtained by a sequential biaxial stretching method is passed through between Meyer bars, on which an appropriate amount of a coating solution containing meta-type wholly aromatic polyamide, an alumina particle, dimethylacetamide (DMAc) and tripropylene glycol (TPG) is provided, then subjected to coagulation, water washing, and drying steps, to obtain a non-water-based separator for a rechargeable battery, in which a heat-resistant porous layer is formed.

In Patent Document 5, a polyethylene microporous membrane obtained by a sequential biaxial stretching method is passed through between facing Meyer bars, on which an appropriate amount of a coating solution containing meta-type wholly aromatic polyamide, aluminum hydroxide. DMAc and TPG is provided, then subjected to coagulation, water washing, and drying steps, to obtain a non-water-based separator for a rechargeable battery, in which a heat-resistant porous layer is formed.

In Patent Document 6, a polyethylene microporous membrane obtained by a sequential biaxial stretching method is passed through between facing Meyer bars, on which an appropriate amount of a coating solution containing polymetaphenylene isophthalamide and aluminum hydroxide, DMAc and TPG is provided, then subjected to coagulation, water washing, and drying steps, to obtain a non-water-based separator for a rechargeable battery, in which a heat-resistant porous layer is formed.

In Patent Document 7, a laminated porous film is obtained by combining a so-called sequential biaxial stretching method and an in-line coating method, wherein a non-porous membrane-like material with a three-layer structure having a layer including polypropylene containing a β-crystal nucleating agent in the outer layer is stretched in the longitudinal direction using a longitudinal stretching device, and after an aqueous dispersion containing alumina crystals and polyvinyl alcohol is then applied using a Meyer bar, the product is stretched in the transverse direction to twice the width and subjected to heat setting/relaxation treatment.

In Patent Document 8, a separation membrane obtained with a sequential biaxial stretching method using a stretching method of setting the angle at which an object to be stretched and a stretching roller make contact to at least a certain angle in a longitudinal direction stretching machine consisting of four stretching rollers is disclosed.

In Patent Document 9, a method of manufacturing a microporous membrane by stretching a laminate comprising a layer which includes low-melting point polymer and a layer which does not include low-melting point polymer is disclosed.

CITATION LIST

Patent Literature

Patent Document 1: Japanese Unexamined Patent Application Publication No. 2007-273443A
Patent Document 2: Japanese Unexamined Patent Application Publication No. 2008-186721A
Patent Document 3: Japanese Unexamined Patent Application Publication No. 2009-026733A
Patent Document 4: Re-publication of PCT International Publication No. 2008-149895A
Patent Document 5: Japanese Unexamined Patent Application Publication No. 2010-092882A
Patent Document 6: Japanese Unexamined Patent Application Publication No. 2009-205955A
Patent Document 7: Japanese Unexamined Patent Application Publication No. 2012-020437A
Patent Document 8: Japanese Unexamined Patent Application Publication (Translation of PCT Application) No. 2013-530261A
Patent Document 9: Japanese Unexamined Patent Application Publication (Translation of PCT Application) No. 2012-521914A

SUMMARY OF INVENTION

Technical Problem

In recent years, lithium ion secondary batteries have been expected to be expanded to large-scale applications such as large tablets, lawn mowers, electric motorcycles, electric vehicles, hybrid electric vehicles, and small boats in addition to small electronic equipment such as mobile telephones or portable information terminals. In response to the anticipated popularization of large batteries, there is a demand for an increase in capacity and a reduction in cost of lithium ion secondary batteries. In order to cut production costs, it is anticipated that battery separators will become increasingly long (length: 1000 m or longer) in the future. Increasing the separator length reduces the replacement time for battery separator rolls in the slit process or the battery assembly process, which makes it possible to reduce material loss.

In a battery separator provided with a porous layer, when the range of thickness variation in the porous layer with respect to the longitudinal direction is large, there are thin portions which are not thick enough to impart adequate functionality. In such cases, in order to sufficiently ensure the function of the porous layer, it is necessary to set the average thickness to 1.5 to 2 times the minimum required thickness, which is a factor contributing to high cost. In addition, if the thickness of the separator becomes large, the number of turns of the electrode roll is reduced, which also becomes a factor which inhibits increases in the capacity of the battery.

Further, increasing the length of the battery separator also has an adverse effect on the winding appearance of the roll due to deviation in winding caused by an increase in diameter when the separator is formed into a roll. The number of turns in the roll increases further due to a reduction in separator width, and this effect becomes prominent.

An object of the present invention is to obtain a laminated polyolefin microporous membrane which has excellent shutdown characteristics, is suitable for making the thickness of the porous layer uniform, has a length of not less than 1000 m, and has a variation range of not greater than 1 MPa in the F25 value in the longitudinal direction. Another object of the present invention is to obtain a battery separator suitable for increasing the capacity of a battery provided with the aforementioned laminated polyolefin microporous membrane and a porous layer of a uniform thickness provided on one or more sides thereof. In this specification, a porous layer of a uniform thickness means that the variation range (R) in the thickness of the porous layer in the longitudinal direction is not greater than 1.0 μm.

Solution to Problem

In light of the problems described above, the present inventors not only conducted dedicated research on coating technology, but also pursued a proper method of coating for a laminated polyolefin microporous membrane to complete the invention.

In order to solve the problems described above, the laminated polyolefin microporous membrane of the present invention comprises the configuration below.

Specifically, the present invention is as follows:

(1) A laminated polyolefin microporous membrane having a first polyolefin microporous membrane and a second polyolefin microporous membrane; a shutdown temperature being from 128 to 135° C.; an air permeation resistance increase rate at 30° C. to 105° C. per 20 μm of thickness being less than 1.5 sec/100 cc Air/° C.; and a variation range in an F25 value in a longitudinal direction being not greater than 1 MPa, wherein the F25 value represents a value determined by dividing the load at 25% elongation of a sample piece using a tensile tester by the cross-sectional area of the sample piece.

(2) In the laminated polyolefin microporous membrane of the present invention, the second polyolefin microporous membrane preferably contains a resin having a melt flow rate of from 25 to 150 g/10 min and a melting point of not lower than 120° C. and lower than 130° C.

(3) In the laminated polyolefin microporous membrane of the present invention, a porous layer containing a water-soluble resin or a water-dispersible resin and heat-resistant particles and having an average thickness T(ave) of from 1 to 5 μm is preferably provided on one or more sides.

(4) In the laminated polyolefin microporous membrane of the present invention, the variation range (R) in thickness in the longitudinal direction of the porous layer is preferably not greater than 1.0 μm.

(5) In the laminated polyolefin microporous membrane of the present invention, the water-soluble resin or water-dispersible resin preferably contains at least one type of resin selected from the group consisting of polyvinyl alcohol, acrylic resins, and polyvinylidene fluoride resins.

(6) The length of the laminated polyolefin microporous membrane of the present invention is preferably not less than 2000 m.

(7) The length of the laminated polyolefin microporous membrane of the present invention is preferably not less than 3000 m.

In order to solve the problems described above, the production method for a battery separator in which a porous layer is provided on the laminated polyolefin microporous membrane of the present invention comprises the configuration below.

Specifically, the present invention is as follows:

(8) A production method for a laminated polyolefin microporous membrane comprising the steps of:

(a) preparing a first polyolefin solution by melt-kneading a membrane-forming solvent into a first polyolefin composition;

(b) preparing a second polyolefin solution by melt-kneading a membrane-forming solvent into a second polyolefin composition;

(c) forming an unstretched gel-like sheet by simultaneously extruding the first and second polyolefin solutions from a single die and cooling the solutions;

(d) obtaining a longitudinally stretched gel-like sheet by passing the unstretched gel-like sheet between three or more pairs of longitudinal stretching rollers and increasing a peripheral speed between each of the rollers in a stepwise manner so as to stretch the sheet in a machine direction wherein the pair of longitudinal stretching rollers comprises a longitudinal stretching roller and a nip roller contacting the longitudinal stretching roller in parallel, and a contact pressure of the nip roller against the longitudinal stretching roller is not lower than 0.05 MPa and not higher than 0.5 MPa;

(e) obtaining a biaxially stretched gel-like sheet by holding the longitudinally stretched gel-like sheet so that a distance between clips is not greater than 50 mm at a tenter exit and stretching the sheet in the transverse direction;

(f) extracting the membrane-forming solvent from the biaxially stretched gel-like sheet and drying the sheet; and (g) heat-treating the dried sheet to obtain a laminated polyolefin microporous membrane.

(9) In the production method for a battery separator according to the present invention, a peripheral speed ratio of neighboring longitudinal stretching rollers in step (d) preferably increases in a stepwise manner.

(10) The production method for a battery separator according to the present invention preferably includes winding the laminated polyolefin microporous membrane around a winding core at a transporting speed of not less than 50 m/min.

(11) The production method for a battery separator according to the present invention preferably includes applying a coating solution containing a water-soluble resin or a water-dispersible resin and heat-resistant particles to one or more sides of the laminated polyolefin microporous membrane with a roller coating method using a coating roller having an eccentricity tolerance of not greater than 10 μm/mΦ100 mm, and then drying.

(12) In the production method for a battery separator according to the present invention, the coating roller is preferably a gravure roller.

Advantageous Effects of Invention

According to an embodiment of the present invention, a laminated polyolefin microporous membrane which has excellent shutdown characteristics and is suitable for making the thickness of the porous layer uniform is obtained. In addition, according to another embodiment of the present invention, a battery separator suited for increasing the capacity of a battery in which the thickness of a porous layer is made uniform on a polyolefin microporous membrane is obtained.

DESCRIPTION OF EMBODIMENTS

Figure 1:
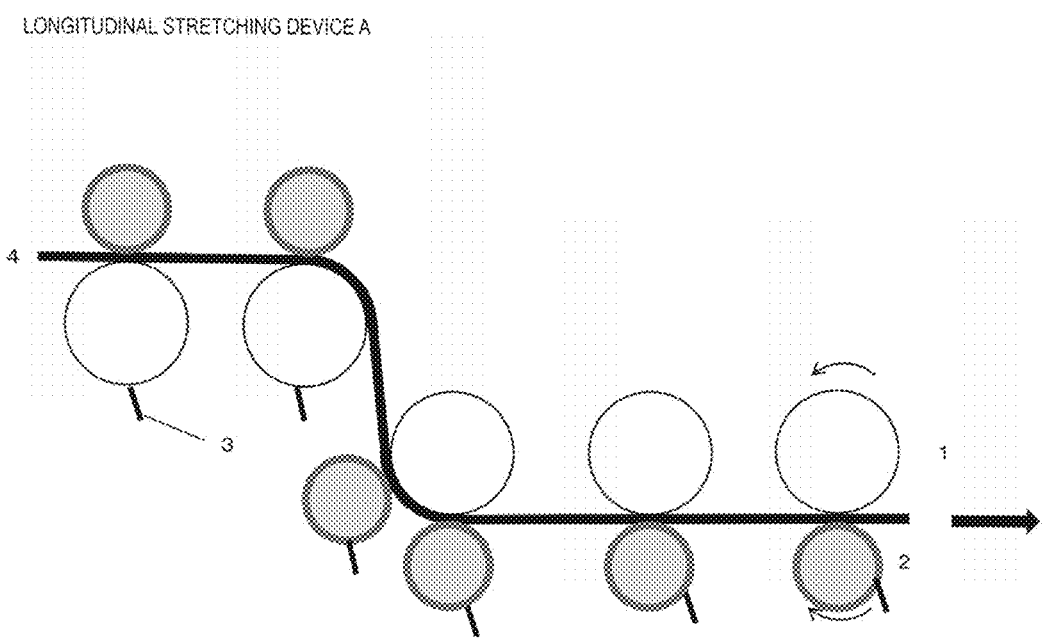
FIG. 1 is a schematic diagram illustrating a longitudinal stretching device A used in sequential biaxial stretching.

The laminated polyolefin microporous membrane of the present invention has a length of not less than 1000 m, and the variation range in the F25 value in the longitudinal direction is not greater than 1 MPa wherein, the F25 value represents a value determined by dividing the load at 25% elongation of a sample piece using a tensile tester by the cross-sectional area of the sample piece.

By setting variation range in the F25 value in the longitudinal direction to not greater than 1 MPa, the present invention exhibits an excellent effect that the contact pressure along the line of contact between the laminated polyolefin microporous membrane and the coating roller (abbreviated as the "coating contact line" hereafter) is easily made uniform with respect to the longitudinal direction of the laminated polyolefin microporous membrane, and the coating thickness is easily made uniform. If the variation range in the F25 value in the longitudinal direction exceeds 1 MPa, unevenness arises in the winding stiffness of a roll of the microporous membrane when wound in the slit process or the coating process, which causes bending or deviation in roll and deteriorates the winding appearance. This becomes prominent, for example, when processed at a high speed so that the transporting speed when wound around a winding core is not less than 50 m/min.

1. Laminated Polyolefin Microporous Membrane

The laminated polyolefin microporous membrane should have at least a first polyolefin microporous membrane and a second polyolefin microporous membrane from the perspective of a balance of shutdown characteristics and physical properties such as strength and permeability. From the perspective of a balance of the front and back of the laminated polyolefin microporous membrane, it is more preferable to use a three-layer structure comprising a first polyolefin microporous membrane/second polyolefin microporous membrane/first polyolefin microporous membrane or a second polyolefin microporous membrane/first polyolefin microporous membrane/second polyolefin microporous membrane. The first polyolefin microporous membrane is formed from a first polyolefin resin composition, and the second polyolefin microporous membrane is formed from a second polyolefin resin composition.

[1] First Polyolefin Microporous Membrane

The first polyolefin microporous membrane is formed from a first polyolefin resin composition. A polyethylene or polypropylene is preferable as the polyolefin resin composition. Additionally, the polyolefin resin can be a single component, a mixture of two or more kinds of different polyolefin resins, for example a mixture of polyethylene and polypropylene, or copolymer of different olefins. A polyethylene resin is preferable from the perspective of shutdown characteristics.

The first polyethylene resin composition contains a polyethylene as a main component, and the polyethylene content is preferably not less than 80 mass %, more preferably not less than 90 mass %, and even more preferably not less than 100 mass % relative to 100 mass % of the first polyethylene resin composition in order to enhance the permeability and pin puncture strength. The composition may also contain a polypropylene at a ratio of not greater than 20 mass %.

Types of polyethylenes include high-density polyethylenes having a density exceeding 0.94 g/cm$^3$, medium-density polyethylenes having a density in the range of from 0.93 to 0.94 g/cm$^3$, low-density polyethylenes having a density lower than 0.93 g/cm$^3$, ultrahigh molecular weight polyethylenes, and straight-chain low-density polyethylenes. The composition preferably contains an ultrahigh molecular weight polyethylene. When a coextrusion method is used, it becomes difficult to control irregularities in physical properties in the width direction due to differences in the viscosity of each layer, but containing an ultrahigh molecular weight polyethylene reinforces the molecular network of the entire membrane. As a result, thick spots due to non-uniform deformity during stretching are suppressed, which makes it possible to obtain a microporous membrane having uniform physical properties. The composition even more preferably contains a high-density polyethylene and an ultrahigh molecular weight polyethylene from the perspective of strength.

The ultrahigh molecular weight polyethylene may not only be a homopolymer of ethylene, but may also be a copolymer that contains a small amount of other α-olefins. Examples of the α-olefins include propylene, 1-butene, 1-hexene, 1-pentene, 4-methyl-1-pentene, octene, vinyl acetate, methyl methacrylate, styrene and the like.

The weight average molecular weight (referred to as "Mw" hereafter) of the ultrahigh molecular weight polyethylene is preferably not less than $1 \times 10^6$ and less than $4 \times 10^6$. When the Mw is within the preferable range described above, it is possible to produce finer pores and fibrils and to increase the pin puncture strength.

The weight average molecular weight of the high-density polyethylene is preferably not less than $1 \times 10^5$ and more preferably not less than $2 \times 10^5$. The upper limit of the Mw is preferably $8 \times 10^5$ and more preferably $7 \times 10^5$. When the Mw is within the preferable range described above, it is possible to achieve both stability of membrane formation and the pin puncture strength obtained as a result.

The content of the ultrahigh molecular weight polyethylene is preferably from 15 to 45 mass % and more preferably from 18 to 40 mass % relative to 100 mass % of the entire polyethylene resin of the first microporous membrane from the perspective of achieving both pin puncture strength and air permeation resistance and suppressing variation in air permeation resistance.

The first polyethylene resin composition contains essentially no low-melting-point resins. The expression, "contains practically no low-melting-point resins" means that, for example, the proportion of eluted components equal to or under 90° C. extracted by cross-fractionation chromatography is not greater than 5.0 mass %. This is because it is difficult to remove low-molecular weight components, which may have a low melting point, to 0 mass %, due to the molecular weight distribution of polymers, even if the low-melting-point resin is not added intentionally. If the low-melting-point resin is present across all the layers, air permeation resistance may degrade upon heating even before shutdown.

For example, the elute components from cross-fractionation chromatography can be obtained as follows.

Measurement instrument: cross-fractionation chromatography CFC-2 (Manufactured by Polymer ChAR, S.A.)
  Detector: IR spectrophotometer IR4 (Manufactured by Polymer ChAR, S.A.)
  Detection wavelength: 3.42 μm
  Column: Shodex (trade mark) UT806M, manufactured by Showa Denko, K. K.
  Column temperature: 140° C.
  Solvent (mobile phase): o-dichlorobenzene
  Solvent flow rate: 1.0 ml/min
  Sample concentration: 3.0 mg/mL
  Temperature reduction time: 140 minutes (140° C.→0° C.)

The amount of elute components not higher than 90° C.: By fractioning elution from 0° C. to 140° C. into sections for every 10° C., and dividing the sum of the amounts from 0° C. to 90° C. by the total amounts of the elution, the amount of elute components not higher than 90° C. can be calculated.

[2] Second Polyolefin Microporous Membrane

The second polyolefin microporous membrane is formed from a second polyolefin resin composition. The second polyolefin resin composition may be a polyolefin resin composition of the same type as the first polyolefin resin composition as long as it has the following characteristics. The second polyolefin resin composition preferably contains not less than 50 mass % of a high-density polyethylene from the perspective of strength. The weight average molecular weight of the high-density polyethylene is preferably from $1 \times 10^5$ to $8 \times 10^5$ and more preferably from $2 \times 10^5$ to $7 \times 10^5$. When within the preferable range described above, it is possible to achieve both stability of membrane formation and the pin puncture strength obtained as a result.

It is important for the second polyethylene resin composition to contain a low-melting-point resin in order to impart the second polyolefin microporous membrane with a shutdown function at low temperatures and enhance the characteristics as a battery separator. Examples of low-melting-point resins include low-density polyethylenes, straight-chain low-density polyethylenes, and ethylene/α-olefin copolymers. Examples of α-olefins include the same α-olefins as in the case of the first polyethylene resin composition.

It is important that a melt flow rate (MFR) of the low-melting-point resin is not less than 25 g/10 min. The MFR is more preferably not less than 50 g/10 min and even more preferably not less than 100 g/min. When MFR is not less than 25 g/10 min, because of greater fluidity, the thickness inhomogeneity is less likely to develop during stretching process and homogeneous thickness distribution can be achieved. Also, because of greater molecular motility, residual strain is less likely to remain and the molecules are sufficiently relaxed at low temperatures, resulting in less likelihood of pore closure at temperatures lower than the melting point due to residual strain. Therefore, it is possible to prevent increases in permeability in a temperature range of from 30° C. to 105° C. The upper limit is preferably 150 g/min and more preferably 140 g/min. When the MFR exceeds 150 g/min, the viscosity of the melt is so low that each layer may not be extruded uniformly during coextrusion with the first polyethylene resin composition. Also, the microporous membrane may break due to low viscosity during the stretching process at the time of production.

It is important for the melting point of the low-melting-point resin to be not lower than 120° C. and lower than 130° C. When the melting point is lower than 120° C., the melting point is so low that the resin component constituting the second polyolefin microporous membrane may melt during lamination by a coextrusion method when the stretching temperature is raised to a temperature at which the laminate can be sufficiently stretched at the time of lamination with the first polyethylene resin composition containing an ultrahigh molecular weight resin. This may have an adverse effect on pore formation and may diminish the air permeation resistance. Alternatively, if the temperature during the stretching as a whole is reduced to avoid pore closures, softening of the multi-layer structure as a whole becomes insufficient. Thereby, the effect of homogeneous thickness expected from addition of the large molecular weight ingredients in the layer A may not be achieved sufficiently. On the other hand, if the melting point is not lower than 130° C., it may become difficult to achieve the low target shutdown temperature.

The lower limit of the low-melting-point resin content is preferably from 20 to 35 mass % and more preferably from 25 to 30 mass % relative to 100 mass % of the second polyethylene resin composition. If the content is not less than 20 mass %, it is possible to set the shutdown temperature to 128 to 135° C. If the content is not greater than 35 mass %, the breakage of the microporous membrane, which tends to occur at the time of transverse stretching in the production of the membrane, can be suppressed.

The second polyethylene resin composition preferably contains an ultrahigh molecular weight polyethylene from the perspective of pin puncture strength. The ultrahigh molecular weight polyethylene is preferably the same as that of the first polyethylene resin composition.

The lower limit of the ultrahigh molecular weight polyethylene content of the second polyethylene resin composition is preferably from 10 to 40 mass % and more preferably from 18 to 30 mass % relative to 100 mass % of the entire polyethylene resin. The ultrahigh molecular weight polyethylene has a large difference in molecular motility relative to the low-molecular-point resin. Therefore, if the content exceeds 40 mass %, separation from the low-melting-point resin tends to occur during melt-kneading process, which may result in poor appearance of the microporous membrane that is ultimately obtained.

The ratio (Mw/Mn) of the weight average molecular weight (Mw) and the number average molecular weight (Mn) of the first polyethylene resin composition and the second polyethylene resin composition is preferably within the range of from 5 to 200 and more preferably within the range of from 10 to 100. Setting the range of Mw/Mn to the preferable range described above facilitates the extrusion of the polyethylene solution. In addition, even when the thickness of the polyethylene microporous membrane is reduced, sufficient mechanical strength is achieved. The value of Mw/Mn is used as a measure of molecular weight distribution, and if this value is greater for polyethylene formed of a single component, for example, the range of the molecular weight distribution is greater. The value Mw/Mn of polyethylene formed of a single component can be adjusted as appropriate by multi-step polymerization of polyethylene. In addition, the value of Mw/Mn of a polyethylene mixture can be adjusted as appropriate by adjusting the molecular weight or mixing ratio of each component.

The laminated polyolefin microporous membrane of the present invention may include various additives such as an antioxidant, a heat stabilizer, an anti-static agent, and an ultra-violet absorbent as well as a blocking retardant and fillers, as long as these additives do not diminish the effect of the present invention. In particular in order to prevent oxidation degradation of the polyolefin resin due to thermal history, it is preferable to add an antioxidant. The appropriate selection of the types and amounts of an antioxidant and a heat stabilizer is important for the adjustment or enhancement of the characteristics of the microporous membrane.

It is preferable for the polyolefin microporous membrane used in the present invention to contain essentially no inorganic particles. The expression "contains essentially no inorganic particles" means that the content of inorganic elements determined by X-ray fluorescence spectroscopy, for example, is preferably not greater than 50 ppm, more preferably not greater than 10 ppm, and most preferably not greater than the detection limit. This is because even if the particles are not added to the laminated polyolefin microporous membrane intentionally, contamination originating from foreign substances, raw materials, or desquamation of dirt deposited on the processing line or apparatus in the polyolefin microporous membrane manufacturing processes may be present in the membrane, and this may be detected at 50 ppm or lower.

The variation range of the F25 value in the longitudinal direction of the laminated polyolefin microporous membrane of the present invention is not greater than 1 MPa, preferably not greater than 0.8 MPa, more preferably not greater than 0.6 MPa, and even more preferably not greater than 0.4 MPa. As described below, the variation range of the F25 value in the longitudinal direction of the laminated polyolefin microporous membrane can be controlled by controlling the longitudinal stretching step and the transverse stretching step very precisely, in particular.

[3] Production Method for Laminated Polyolefin Microporous Membrane

A production method for a laminated polyolefin microporous membrane can be selected freely in accordance with the purpose thereof as long as the various characteristics described above are satisfied. Methods of producing microporous membranes include the foaming method, the phase-separation method, the melt-recrystallization method, the drawing-pore-opening method, the powder-sintering method and the like, and the phase-separation method is preferred among these from the viewpoints of homogenization of micropores and cost.

An example of a production method using the phase-separation method is a method of melt-kneading a polyolefin and a membrane-forming solvent while heating, extruding the resulting polyolefin resin solution from a die, cooling the extrudate to form a gel-like sheet, stretching the gel-like sheet in two directions, and then removing the membrane-forming solvent to obtain a laminated microporous membrane.

The production method for a laminated polyolefin microporous membrane according to the present invention will be described in detail hereinafter.

In the present invention, stretching is performed at a prescribed ratio in two directions including the longitudinal direction (also called the "MD" or "machine direction") and the width direction (also called the "TD" or "transverse direction") by a roller method, a tenter method, or a combination of these methods. In the present invention, stretching is preferably performed by a sequential biaxial stretching method, wherein stretching is sequentially performed in the machine direction and the transverse direction. A simultaneous biaxial stretching method is a stretching method of fixing both ends of an unstretched gel-like sheet with clips for gripping the ends and then simultaneously expanding the clips in the machine direction and the transverse direction. In such a simultaneous biaxial stretching method, the spacing of the clips increases in step with the stretching ratio, and variation arises in the quality of the sheet in the longitudinal direction, which may cause the variation range of the F25 value to increase in the longitudinal direction as a result.

The production method for a laminated polyolefin microporous membrane according to the present invention comprises the following steps of (a) to (f):

(a) preparing a first polyolefin solution by melt-kneading a membrane-forming solvent into a first polyolefin composition;

(b) preparing a second polyolefin solution by melt-kneading a membrane-forming solvent into a second polyolefin composition;

(c) forming an unstretched gel-like sheet by simultaneously extruding the first and second polyolefin solutions from a single die and cooling the solutions;

(d) obtaining a longitudinally stretched gel-like sheet by passing the unstretched gel-like sheet between three or more pairs of longitudinal stretching rollers and increasing a peripheral speed between each of the rollers in a stepwise manner so as to stretch the sheet in a longitudinal direction, wherein the pair of longitudinal stretching rollers comprises a longitudinal stretching roller and a nip roller contacting the longitudinal stretching roller in parallel, and a contact pressure of the nip roller against the longitudinal stretching roller is not lower than 0.05 MPa and not higher than 0.5 MPa:

(e) obtaining a biaxially stretched gel-like sheet by holding the longitudinally stretched gel-like sheet so that a distance between clips is not greater than 50 mm at a tenter exit and stretching the sheet in the transverse direction; and (f) extracting the membrane-forming solvent from the biaxially stretched gel-like sheet and drying the sheet.

Further, a corona treatment step or the like may be implemented as necessary after the steps of (a) to (f).

Each step is described below using the example in which polyethylene resin is used as polyolefin resin.

(a) Preparing a First Polyolefin Resin Solution

In preparing a first polyolefin resin solution, a polyolefin resin solution is prepared by adding a membrane-forming solvent to a first polyolefin resin composition and then melt-kneading the mixture. As a method of melt-kneading, methods using a twin-screw extruder described in Japanese Examined Patent Application Publication No. H06-104736 and Japanese Patent No. 3347835 can be used. Since melt-kneading methods are publicly known, explanation is omitted.

The membrane-forming solvent is not limited as long as it can dissolve polyethylene sufficiently. Examples include aliphatic or cyclic hydrocarbons such as nonane, decane, undecane, dodecane, and liquid paraffin, or mineral oil fractions having boiling points corresponding to these, and a non-volatile solvent such as liquid paraffin is preferable.

The concentration of the polyethylene resin in the first polyolefin resin is preferably from 25 to 40 parts by weight per 100 parts by weight of the total of the polyethylene resin and the membrane-forming solvent. If the polyethylene resin concentration is within the preferable range described above, swell and neck-in phenomena at the exit of the die can be prevented as the polyethylene resin solution is extruded, and the formability and self-supporting characteristics of the gel-like sheet are maintained.

(b) Preparing a Second Polyolefin Solution

Preparing a second polyolefin resin solution may be the same as preparing the first polyolefin resin solution with the exception that a second polyolefin resin composition is used.

(c) Molding an Unstretched Gel-Like Sheet

In molding an unstretched gel-like sheet, a polyethylene resin solution is fed to a die directly from the extruder or via a separate extruder, extruded into a sheet shape, and cooled to form an unstretched gel-like sheet. A plurality of polyolefin solutions of the same or different compositions may be fed from the extruder to a single die, laminated therein into a layer shape, and extruded into a sheet shape.

The extrusion method may be the flat die method or the inflation method. The extrusion temperature is preferably from 140 to 250° C., and the extrusion rate is preferably from 0.2 to 15 m/min. The membrane thickness can be adjusted by adjusting the extruded amount of the polyolefin solution. Methods disclosed in Japanese Examined Patent Application Publication No. H06-104736 and Japanese Patent No. 3347835 can be used as an extrusion method.

A gel-like sheet is formed by cooling the polyethylene resin solution that is extruded into a sheet shape. A method of bringing into contact with a cooling medium, such as cold air and cooling water, a method of bringing into contact with a cooling roller, and the like can be used as a cooling method, but it is preferable to cool the sheet by bringing the sheet into contact with a roller cooled with a cooling medium. For example, an unstretched gel-like sheet can be formed by bringing the polyethylene resin solution that is extruded into a sheet shape into contact with a rotating cooling roller, a surface temperature of which is set to from 20° C. to 40° C. with a refrigerant. The extruded polyethylene resin solution is preferably cooled down to the temperature not higher than 25° C.

(d) Longitudinal Stretching

In longitudinal stretching, a longitudinally stretched gel-like sheet is obtained by passing the unstretched gel-like sheet through a plurality of preheating rollers, heating the sheet to a prescribed temperature, and then passing the sheet through three or more pairs of longitudinal stretching rollers having a peripheral speed which is increased in a stepwise manner between the rollers so as to stretch the sheet in the longitudinal direction.

In the present invention, performing uniform longitudinal stretching while suppressing sheet slippage during longitudinal stretching is critical for controlling the F25 value in the longitudinal direction.

In stretching, the pair of rollers comprises a longitudinal stretching roller and a nip roller contacting the longitudinal stretching roller in parallel with a contact pressure, and the unstretched gel-like sheet is passed between three or more pairs of rollers so that longitudinal stretching is achieved by the peripheral speed ratio between the rollers. By positioning the nip roller so as to be parallel to the longitudinal stretching roller, the sheet is brought into close contact with the longitudinal stretching roller, and by fixing the stretching position of the sheet, it is possible to make the sheet travel stably and to ensure uniform longitudinal stretching. In addition, in order to ensure uniform longitudinal stretching, longitudinal stretching is preferably divided into two or more stages of stretching rather than single stage of stretching so as to achieve the desired stretching ratio. That is, it is important to provide three or more pairs of longitudinal stretching rollers.

In the present invention, it is important to stretch the unstretched gel-like sheet in the longitudinal direction by increasing the peripheral speed between the stretching rollers in a stepwise manner. The peripheral speed ratio of neighboring stretching rollers is also preferably increased in a stepwise manner. That is, by making the peripheral speed ratio between the first stretching roller and the second stretching roller small and sequentially increasing the peripheral speed ratio between the second and third stretching rollers and the peripheral speed ratio between the third and fourth stretching rollers, it is possible to achieve productivity while controlling the variation range of F25 in the longitudinal direction. This is because although the unstretched gel-like molded sheet tends to slip as a result of containing a large amount of the membrane-forming solvent at the point when it is passed through the first stretching roller, increasing the peripheral speed between each of the stretching rollers in a stepwise manner yields an effect of squeezing out the membrane-forming solvent, which makes it possible to prevent slippage in longitudinal stretching. Here, the squeezing effect means that by squeezing out the membrane-forming solvent from the unstretched gel-like sheet or the gel-like sheet undergoing longitudinal stretching, it is possible to stretch the sheet stably while suppressing slippage with respect to the longitudinal stretching roller.

The upper limit of the peripheral speed ratio of the stretching rollers in the first stage of stretching is preferably not greater than 1.5, more preferably not greater than 1.3, and even more preferably not greater than 1.2. The lower limit is preferably 1.1. In addition, the different between the peripheral speed ratios of each of the neighboring stretching rollers is not greater than 0.5, preferably not greater than 0.4, and even more preferably not greater than 0.3.

The spacing between neighboring stretching rollers is preferably set so that the distance from the point where the gel-like molded sheet being stretched moves away from a stretching roller and to the point where the sheet comes into contact with the next stretching roller is in the range of from 150 mm to 500) mm. If the spacing between neighboring stretching rollers is less than 150 mm, the variation range of F25 may become large. If the spacing exceeds 500 mm, decreases in the temperature of the gel-like molded sheet being stretched are prevented, which may cause stretching spots.

The temperature of the sheet in longitudinal stretching is preferably not higher than the melting point of the polyolefin resin +10° C. In addition, the stretching ratio is preferably not less than 9 times and more preferably from 16 to 400 times in terms of planar magnification, from the perspectives of the elasticity and strength of the laminated polyolefin microporous membrane.

The surface temperature of the longitudinal stretching rollers is controlled for each roller so that the variation range in surface temperature is not greater than ±2° C. over the effective width (width the sheet under stretching passes) of the stretching roller. The surface temperature of the longitudinal stretching roller can be measured with an infrared radiation thermometer, for example.

The longitudinal stretching roller is preferably a metal roller with hard chromium plating having a surface roughness of from 0.3 S to 5.0 S. If the surface roughness is within this range, the thermal conductivity is good, and the slippage of the sheet can be effectively suppressed by the synergistic effect with the nip roller.

In an embodiment of the present invention, the slippage of the gel-like sheet is suppressed during longitudinal stretching using the nip roller. If the contact area between the longitudinal stretching roller and the gel-like sheet is increased without using a nip roller, a sufficient slippage suppressing effect may not be achieved, and the variation range of the F25 value may increase. In addition, when an attempt is made to suppress the slippage of the sheet with a single nip roller, it is necessary to increase the pressure with which the nip roller makes contact with the stretching roller (also called the "nip pressure"), which leads to a risk that the pores of the resulting laminated polyolefin microporous membrane may be collapsed. Therefore, it is important to use three or more nip rollers and to keep the nip pressure to the longitudinal stretching roller forming a pair with each nip roller to a relatively small level. A plurality of nip rollers may also be used for a single longitudinal stretching roller.

The nip pressure of each nip roller is not lower than 0.05 MPa and not higher than 0.5 MPa. If the nip pressure of the nip roller exceeds 0.5 MPa, there is a risk that the pores of the resulting laminated polyolefin microporous membrane may be collapsed. If the nip pressure is lower than 0.05 MPa, a slippage suppressing effect is not achieved due to insufficient nip pressure, and the effect of squeezing out the membrane-forming solvent is also difficult to achieve. The lower limit of the nip pressure of the nip roller is preferably 0.1 MPa and more preferably 0.2 MPa, and the upper limit is preferably 0.5 MPa and more preferably 0.4 MPa. If the nip pressure of the nip roller is within the range described above, an appropriate slippage suppressing effect is achieved.

In addition, the nip rollers must be covered with a heat-resistant rubber. During longitudinal stretching, the membrane-forming solvent bleeds out from the gel-like sheet due to pressure caused by heat or tension. In particular, bleed-out is prominent in longitudinal stretching immediately after extrusion. The sheet is transported or stretched while the membrane-forming solvent that bleeds out is present at the interface between the sheet and the roller surface, which causes the sheet to become susceptible to slipping. By positioning the nip roller covered with a heat-resistant rubber so as to make a contact with the longitudinal stretching roller in parallel and passing the unstretched gel-like sheet between the rollers, it is possible to stretch the sheet while squeezing out the membrane-forming solvent from the gel-like sheet being stretched. Thus, it is possible to suppress slippage.

The nip roller is preferably a roller prepared by covering a metal roller having a diameter of from 100 to 300 mm with a heat-resistant rubber having a thickness of from 3 to 20 mm. A so-called rubber roller in which the volume of the heat-resistant rubber portion constitutes not less than 80% of the volume tends to bend and does not apply a uniform pressure in the width direction, which is not preferable.

In longitudinal stretching, the slippage suppressing effect is achieved even more effectively by using a method in which the membrane-forming solvent adhering to the longitudinal stretching roller and the nip roller is removed (also called a "scraping method") in combination. The scraping method is not particularly limited, but methods include scraping with a doctor blade, blowing or aspirating with compressed air, and combinations of these methods. In particular, a method of scraping using a doctor blade is preferable in that it can be implemented relatively easily. A preferable method is to place a doctor blade on the longitudinal stretching roller so as to be parallel to the width direction of the longitudinal stretching roller and to scrape off the membrane-forming solvent to an extent that the membrane-forming solvent cannot be seen on the stretching roller surface from the point immediately after the sheet passes over the doctor blade to the point where the gel-like sheet under stretching makes contact with the blade. A single doctor blade may be used, or a plurality of doctor blades may be used. In addition, the scraping method or unit may be implemented on either the longitudinal stretching roller or the nip roller or on both rollers.

The material of the doctor blade is not particularly limited as long as it has resistance to a membrane-forming solvent. However, a resin or rubber doctor blade is preferable instead of a metal blade because such a blade does not have an adverse electrical effect even if the shavings of the doctor blade are immixed with the laminated polyolefin microporous membrane is preferable. In the case of a metal doctor blade, there is a risk of scratching the stretching roller. Examples of the resin doctor blades include polyester, polyacetal, and polyethylene doctor blades.

(e) Transverse Stretching

In transverse stretching, a biaxially stretched gel-like sheet is obtained by fixing both ends of the longitudinally stretched gel-like sheet using clips and then expanding the clips in the transverse direction in a tenter so as to stretch the longitudinally stretched gel-like sheet in the transverse direction. The distance between the clips in the transporting direction of the sheet is preferably kept at not greater than 50 mm, more preferably not greater than 25 mm, and even more preferably not greater than 10 mm from the tenter entrance to the tenter exit. In addition, the distance between the clips is preferably constant within the range described above. If the distance between the clips is within the preferable range described above, it is possible to suppress the variation range of the F25 value in the width direction.

In order to suppress the effects of sudden changes in temperature in the transverse stretching step or the heat treatment step, it is preferable to divide the inside of the tenter into 10 to 30 zones and to control the temperature independently for each zone. In particular, in the zones set to the maximum temperature in the heat treatment step, it is preferable to increase the temperature of each zone with hot air in a stepwise manner in the transporting direction of the sheet so as to ensure that there are no sudden changes in temperature between each of the zones in the heat treatment step.

(f) Removing the Membrane-Forming Solvent from the Biaxially Stretched Gel-Like Sheet and Drying the Sheet The membrane-forming solvent is removed (washed) from the biaxially stretched gel-like sheet using a removal/washing solvent. The washing solvents that can be used are volatile solvents, and include hydrocarbons such as pentane, hexane, and heptane, chlorinated hydrocarbons such as methylene chloride and carbon tetrachloride, fluorinated hydrocarbons such as trifluoroethane, and ethers such as diethylether and dioxane. These washing solvents are appropriately selected according to the membrane-forming solvent used for dissolving polyethylene, and can be used alone or in combination thereof. Washing methods include immersion and extraction in the washing solvent, showering the washing solvent, suctioning the washing solvent from the opposite side of the sheet, and combinations thereof. The washing described above is repeated until the residual solvent of the sheet reaches less than 1 wt. %. The sheet is then dried, and drying methods include heat drying and air drying.

(g) Heat-Treating the Dried Sheet to Obtain a Laminated Polyolefin Microporous Membrane A laminated polyolefin microporous membrane is obtained by heat-treating the dried sheet. Heat treatment is preferably performed at a temperature within the range of from 90 to 150° C. from the perspectives of thermal shrinkage and air permeation resistance. The residence time of the heat treatment step is not particularly limited but is ordinarily preferably not less than 1 second and not longer than 10 minutes, and more preferably not less than 3 seconds and not longer than 2 minutes. Heat treatment can be performed using any of the methods among the tenter method, roller method, pressing method, or free method.

During heat treatment, it is preferable to shrink the material in at least one of the longitudinal direction and the width direction while the material is fixed in both the longitudinal direction and the width direction. Heat treatment makes it possible to eliminate residual distortion of the laminated polyolefin microporous membrane. The shrinkage rate in the longitudinal direction or the width direction in the heat treatment is preferably from 0.01 to 50% and more preferably from 3 to 20% from the perspective of thermal shrinkage and air permeation resistance. Further, the material may be reheated or restretched in order to enhance the mechanical strength. Restretching may be performed with either a stretching roller method or a tenter method. Note that functionalization steps such as a corona treatment or hydrophilization can be implemented as necessary after the steps (a) to (f).

As described below, the variation range of the F25 value in the longitudinal direction of the laminated polyolefin microporous membrane can be reduced by controlling longitudinal stretching and transverse stretching to a high degree. As a result, not only does it become easy to reduce the variation range of the coating thickness in the porous layer lamination described below, but a battery separator roll having a good winding appearance can also be obtained. Further, by setting the variation range of the F25 value to not greater than 1 MPa, it is possible to suppress meandering during transport in the slit process or coating process, even if processed at a high transporting speed exceeding 50 m/min when wound with a rewinder, for example.

The width of the laminated polyolefin microporous membrane is not particularly limited, but the lower limit is preferably 500 mm, more preferably 600 mm, and even more preferably 1000 mm, and the upper limit is preferably 4000 mm, more preferably 3000 mm, and even more preferably 2000 mm. If the thickness of the laminated polyolefin microporous membrane is within the range described above, the membrane is suitable for the production of a high-capacity battery, and bending due to the weight of the membrane itself is unlikely to occur.

The lower limit of the length of the laminated polyolefin microporous membrane is preferably 1000 m, more preferably 2000 m, and even more preferably 3000 m. The upper limit is not particularly limited but is preferably 10000 m, more preferably 8000 m, and even more preferably 7000 m. When the length of the laminated polyolefin microporous membrane is within the range described above, productivity is enhanced, and bending due to the weight of the membrane itself is unlikely to occur when formed into a roll.

The thickness of the laminated polyolefin microporous membrane is preferably from 5 to 25 μm from the perspective of increasing the capacity of the battery.

The air permeation resistance of the laminated polyolefin microporous membrane is preferably from 50 sec/100 cc Air to 300 sec/100 cc Air.

The porosity of the laminated polyolefin microporous membrane is preferably from 30 to 70%.

The average pore size of the laminated polyolefin microporous membrane is preferably from 0.01 to 1.0 μm from the perspective of pore blocking performance.

2. Porous Layer

The porous layer will be described hereinafter.

The porous layer described in the present invention imparts or enhances one or more functions selected from a group consisting of heat resistance, adhesion to an electrode material, or wettability toward an electrolytic solution. The porous layer consists of inorganic particles and a binder.

A binder has a function of imparting or enhancing the functions described above and binding inorganic particles together as well as a function of binding the laminated polyolefin microporous membrane to the porous layer.

Examples of binders include polyvinyl alcohol, cellulose ether resins, and acrylic resins. Examples of cellulose ether resins include carboxymethyl cellulose (CMC), hydroxyethyl cellulose (HEC), carboxyethyl cellulose, methyl cellulose, ethyl cellulose, cyanethyl cellulose, oxyethyl cellulose, and polyvinylidene fluoride resins. In addition, the binder that is used may be an aqueous solution or an aqueous dispersion and may be a commercially available product. Examples of commercially available products include "POVACOAT" (trade mark) manufactured by Nissin Kasei Co., Ltd., "JULYMER" (trade mark) AT-510, ET-410, FC-60, and SEK-301 manufactured by Toa Gosei Co., Ltd., UW-223SX and UW-550CS manufactured by Taisei Fine Chemical Co., Ltd., WE-301, EC-906EF, and CG-8490 manufactured by DIC (Inc.), "KYRNAR" (trade mark) WATERBORNE manufactured by Arkema Co., Ltd., and VINYCOAT PVDF AQ360 manufactured by Higashi Nippon Toryo Co., Ltd. If heat resistance is emphasized, polyvinyl alcohol and acrylic resins are suitable, and if electrode adhesion and affinity with non-aqueous electrolytic solutions are emphasized, polyvinylidene fluoride resins are suitable.

The average particle size of the inorganic particles is preferably not less than 1.5 times and not greater than 50 times and more preferably not less than 2 times and not greater than 20 times the average pore size of the laminated polyolefin microporous membrane. If the average particle size of the particles is within the preferable range described above, the pores in the laminated polyolefin microporous membrane can be blocked while the heat-resistant resin and the particles coexist, and the air permeation resistance can be maintained as a result. In addition, it is possible to prevent serious defects in the battery caused by shedding of particles in the battery assembly process.

In order to prevent shorting caused by dendrites originating from the electrode material, it is important for the porous layer to contain inorganic particles. Examples of inorganic particles include calcium carbonate, calcium phosphate, amorphous silica, crystalline glass fillers, kaolin, talc, titanium dioxide, alumina, silica-alumina conjugate oxide particles, barium sulfate, calcium fluoride, lithium fluoride, zeolite, molybdenum sulfide, mica, and boehmite. In addition, heat-resistant crosslinked polymeric particles may also be added as necessary. Examples of heat-resistant crosslinked polymeric particles include crosslinked polystyrene particles, crosslinked acrylic resin particles, and crosslinked methyl-methacrylate based particles. Examples of the shape of the inorganic particles include a spherical shape, substantially spherical shape, plate shape, needle shape, or polyhedron shape, but the shape is not particularly limited.

The upper limit of the content of inorganic particles contained in the porous layer is preferably 98 vol. % and more preferably 95 vol. %. The lower limit is preferably 50 vol. % and more preferably 60 vol. %. If the added amount of particles is within the preferable range described above, the curl-reducing effect is sufficient, and the ratio of the functional resin is optimal with respect to the total volume of the porous layer.

The lower limit of the average thickness T(ave) of the porous layer is preferably 1 µm, more preferably 1.5 µm, and even more preferably 2.0 µm, and the upper limit is preferably 5 pun, more preferably 4 µm, and even more preferably 3 µm. If the membrane thickness of the porous layer is within the preferable range described above, it is possible to suppress the variation range (R) of the thickness of the porous layer. A battery separator obtained by laminating the porous layer can ensure membrane puncture resistance and electrical insulation in the event of melting/shrinking at the melting point or higher. In addition, the volume upon winding can be reduced, thus being suitable for battery capacity increase.

The porosity of the porous layer is preferably from 30 to 90% and more preferably from 40 to 70%. The desired porosity can be achieved by appropriately adjusting the inorganic particle concentration, the binder concentration, and the like.

3. Method for Laminating the Porous Layer on the Laminated Polyolefin Microporous Membrane Next, the method for laminating the porous layer on the laminated polyolefin microporous membrane of the present invention will be described.

In the present invention, a battery separator can be obtained by laminating a porous layer on a laminated polyolefin microporous membrane in which the variation range of the F25 value in the longitudinal direction is not greater than 1 MPa. By using the laminated polyolefin microporous membrane according to an embodiment of the present invention, the contact pressure along the line of contact between the laminated polyolefin microporous membrane and the coating roller (abbreviated as the "coating contact line" hereafter) is easily made uniform with respect to the longitudinal direction of the laminated polyolefin microporous membrane, and the coating thickness is easily made uniform.

The method for laminating the porous layer on the laminated polyolefin microporous membrane may be, for example, a method of applying a coating solution containing a resin, inorganic particles, and a dispersion medium to the laminated polyolefin microporous membrane so that a prescribed membrane thickness is achieved using a known roller coating method described below, for example, and drying the product under conditions with a drying temperature of from 40 to 80° C. and a drying time of from 5 to 60 seconds. Examples of solvents include water, alcohols, and mixtures thereof.

Examples of roller coating methods include reverse roller coating and gravure coating, and these methods may be used alone or in combination. Of these, gravure coating is preferable from the perspective of the uniform coating width.

In an embodiment of the present invention, the thickness of the coating contact line between the roller and the laminated polyolefin microporous membrane in the roller coating method is preferably not less than 3 mm and not greater than 10 mm. If the thickness of the coating contact line exceeds 10 mm, the contact pressure between the laminated polyolefin microporous membrane and the coating roller becomes large, which makes the coating surface susceptible to scratching.

Figure 5:
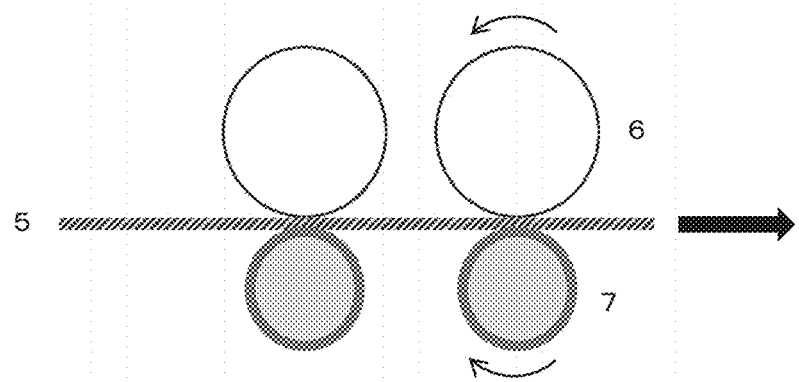
FIG. 5 is a schematic diagram illustrating an example of a longitudinal stretching device used in a restretching step.
Figure 6:
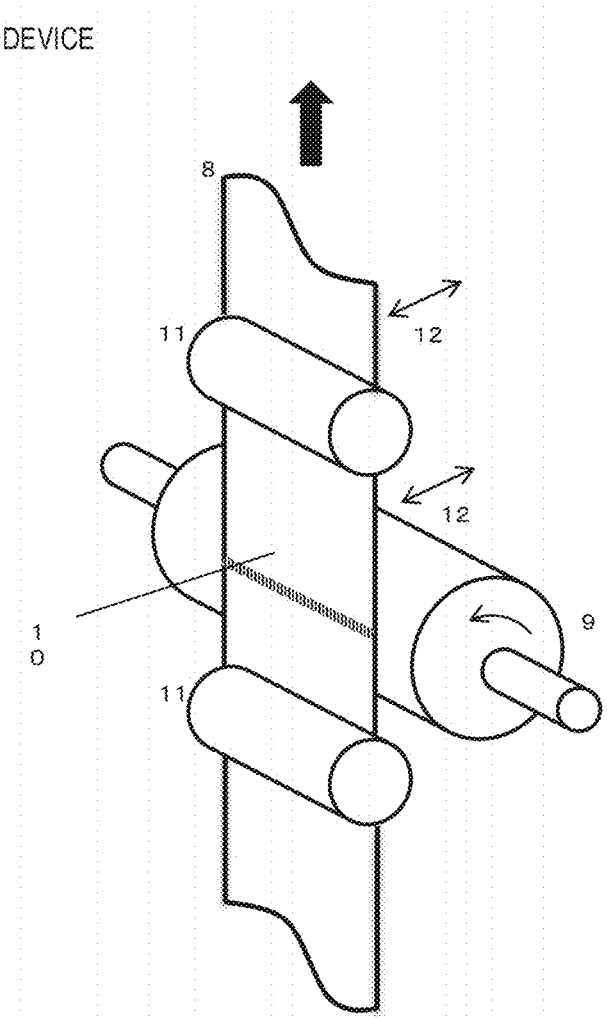
FIG. 6 is a schematic diagram illustrating an example of a coating device.

The coating contact line described in this specification is a line along which the coating roller and the laminated polyolefin microporous membrane make contact, and the thickness of the coating contact line refers to the width in the longitudinal direction of the coating contact line (see FIG. 5). The thickness of the coating contact line can be measured by observing the coating contact line between the coating roller and the laminated polyolefin microporous membrane from the back surface of the laminated polyolefin microporous membrane. The thickness of the coating contact line can be adjusted by adjusting the position of the coating roller in machine direction with respect to the laminated polyolefin microporous membrane or by adjusting the left/right position balance with respect to the horizontal direction of a backing roller positioned behind the coating surface. Backing rollers are more effectively positioned on both the upstream and downstream sides of the coating roller.

The eccentricity tolerance of the coating roller in the roller coating method is preferably not greater than 10 m/Φ100 mm, more preferably not greater than 8 μm/Φ1 mm, and even more preferably not greater than 5 μm/Φ100 mm. If the eccentricity tolerance of the coating roller is within the range described above, it is easy to achieve a uniform coating thickness with respect to the longitudinal direction. The cost increases as the eccentricity tolerance of the coating roller is smaller, but this is critical in achieving the objects of the present invention.

In this specification, the expression that "the thickness of the porous layer in the longitudinal direction of the separator is uniform" means that the variation range (R) of thickness is not greater than 1.0 μm when the length of the separator is not less than 1000 m. The variation range (R) of thickness is preferably not greater than 0.8 μm and more preferably not greater than 0.5 μm.

The solid content concentration of the coating solution is not particularly limited as long as it can be applied uniformly, but it is preferably not less than 20 wt. % and not greater than 80 wt. % and more preferably not less than 50 wt. % and not greater than 70 wt. %. If the solid content concentration of the coating solution is within the preferable range described above, it is easy to achieve a uniform coating thickness, and it is possible to prevent the porous layer from becoming brittle.

4. Battery Separator

The membrane thickness of a battery separator obtained by laminating a porous layer on the laminated polyolefin microporous membrane is preferably from 6 to 30 μm from the perspectives of mechanical strength and battery capacity. The width of the battery separator is not particularly limited, but the lower limit is preferably 30 mm, more preferably 60 mm, and even more preferably 100 mm, and the upper limit is preferably 2000 mm, more preferably 1000 mm, and even more preferably 800 mm. When the thickness of the battery separator is within the range described above, the battery separator is suitable for the production of a high-capacity battery, and bending due to the weight of the battery separator itself is unlikely to occur.

The lower limit of the thickness of the battery separator is preferably 1000 m, more preferably 2000 m, and even more preferably 3000 m. The upper limit is not particularly limited but is preferably 10000 m, more preferably 8000 m, and even more preferably 7000 m. If the length of the battery separator is within the range described above, productivity is enhanced, and bending due to the weight of the battery separator itself is unlikely to occur when formed into a roll.

It is desirable to store the battery separator in a dry state. However, if storage in an absolute dry state is difficult, the battery separator is preferably subjected to vacuum drying treatment at a temperature not higher than 100° C. just before use.

The battery separator of the present invention can be used for separators in rechargeable batteries such as nickel-metal hydride batteries, nickel-cadmium batteries, nickel-zinc batteries, silver-zinc batteries, lithium rechargeable batteries, lithium polymer rechargeable batteries and the like, plastic film capacitors, ceramic capacitors, electric double layer capacitors and the like, but is preferably used as a separator for lithium ion rechargeable batteries. The use of the separator according to an embodiment of the present invention as a separator in a lithium ion rechargeable battery is described below as an example. A lithium ion secondary battery contains an electrolyte solution (electrolyte) and an electrode body in which a positive electrode and a negative electrode are laminated with a separator interposed therebetween. The structure of the electrode body is not particularly limited and may be a known structure. For example, an electrode structure in which disc-shaped cathode and anode are placed to face each other (coin type), an electrode structure in which planar cathode and anode are alternately laminated (lamination type), an electrode structure in which band-shaped cathode and anode are overlapped and wound (winding type) and the like can be employed.

EXAMPLES

The present invention is described below using examples. However, the present invention is not limited by these examples in any way. The measurement values in the examples are the values measured by the methods described below.

1. Measurement of the Variation Range of the F25 Value

Five sample pieces with dimensions of 10 mm (TD)×50 mm (MD) were cut out at equal intervals with respect to the width direction of the laminated polyolefin microporous membranes obtained in the examples and the comparative examples. The sample pieces at both ends were cut out from locations 30 to 40 mm from the ends in the width direction of the microporous membranes. An SS curve in the longitudinal direction of the sample pieces (relationship between the vertical stress and vertical strain) was determined using a tabletop precision universal tester (Autograph AGS-J (manufactured by the Shimadzu Corporation)) in accordance with JIS K7113. The vertical stress value at a point of 25% elongation of the vertical strain was recorded. A value determined by dividing this value by the cross-sectional area of each sample piece prior to the test was used as the F25, and the average value in the width direction of five sample pieces was determined. Each average F25 value in the width direction was determined for five locations at 250 m intervals in the longitudinal direction, and the variation range of the F25 value was determined from the difference between the maximum and minimum values thereof. A laminated polyolefin microporous membrane obtained by peeling off the porous layer from the battery separator may also be used as a sample piece.

Measurement conditions

Load cell capacity: 1 kN

Distance between clips: 20 mm

Test speed: 20 mm/min

Measurement environment: air temperature of 20° C. and 60% relative humidity

2. Variation Range (R) of the Membrane Thickness of the Porous Layer in the Longitudinal Direction Five sample pieces with dimensions of 10 mm (TD)×50 mm (MD) were cut out at equal intervals with respect to the width direction of the laminated polyolefin microporous membranes obtained in the examples and the comparative examples. The sample pieces at both ends were cut out from locations 30 to 40 mm from the ends in the width direction of the microporous membranes. The thickness of the porous layer was determined by performing SEM observations of a cross section of each sample piece. Cross-sectional sample pieces were produced using a cryo-CP method, and in order to prevent charging due to an electron beam, a small amount of metal microparticles were deposited before SEM observations were performed. The membrane thickness was measured using a region where inorganic particles are present as a porous layer, and the average value for five points along the width direction was determined. Each average value in the width direction was determined for five locations at 250 m intervals in the longitudinal direction, and the variation range (R) of the thickness of the porous layer with respect to the longitudinal direction was determined from the difference between the maximum and minimum values thereof. The average value of the thicknesses of a total of 25 sample pieces described above was recorded as the average thickness T(ave) of the porous layer.

Measurement Devices

Field emission-type scanning electron microscope (FE-SEM) S-4800 (manufactured by Hitachi High Technologies Co., Ltd.)

Cross section polisher (CP) SM-9010 (manufactured by JEOL Ltd.)

Measurement Conditions

Acceleration voltage: 1.0 kV

3. Variation Range of the Surface Temperatures of the Longitudinal Stretching Rollers The surface of each roller was measured five times every five minutes with an infrared radiation thermometer, and the variation range of the surface temperatures of the longitudinal stretching rollers was determined from the difference between the maximum and minimum values thereof.

4. Coating Contact Line Thickness Measurement

The coating contact line is a line in the width direction along which the coating roller and the laminated polyolefin microporous membrane make contact at the time of coating. The thickness of the coating contact line is the width of the coating contact line in the longitudinal direction and refers to a value read using a scale through the back surface of the laminated polyolefin microporous membrane.

5. Winding Appearance

Rolls of the battery separators obtained in the examples and the comparative examples were observed visually, and the numbers of locations where bending or deviation in roll occurred were counted.

Evaluation Criteria

Excellent: none
Good: from 1 to 3 locations
Poor: 4 or more locations

6. Scratch Evaluation

After the outermost peripheral portions were removed from the rolls of the battery separators obtained in the examples and the comparative examples, 1 m² of the inner peripheral portions were pulled out and used as samples for evaluation. In the detection of scratches, the coating surface was irradiated with a Brome light (illumination device used in photography and videotaping). Scratches were detected visually, and the number thereof was counted.

Evaluation Criteria

Excellent: not more than 1 location
Good: from 2 to 5 locations
Poor: not fewer than 6 locations 7. Membrane Thickness The membrane thickness was obtained by averaging measurements of 20 points using a contact-type membrane thickness meter (Litematic series 318, manufactured by Mitutoyo Corp.). Measurements were taken under a load of 0.01 N using an ultrahard spherical contact point diameter of φ8.5 mm.

8. Average Pore Diameter

The average pore size of the laminated polyethylene microporous membrane was measured with the following method. A sample was fixed on a measuring cell using a double-sided adhesive tape, on which platinum or gold was vacuum-deposited for several minutes, and the SEM measurement was conducted for the surface of the membrane under appropriate magnification, 10 points in an image obtained in the SEM measurement were selected arbitrarily, an average value of pore diameters at the 10 points was determined as an average pore size of the sample.

9. Air Permeation Resistance (Sec/100 cc Air)

Using Gurley Type Densometer Model B manufactured by TESTER SANGYO CO., LTD, the laminated polyethylene microporous membrane or the battery separator, which was fixed between a clamping plate and an adapter plate so that no wrinkling occurred, was measured in accordance with JIS P8117. Using a 10 cm-square sample, the measurement was performed for total of 5 points as measurement points, including the center and four corners of the sample. The average value of 5 points was used as the air permeation resistance. In the case where the length of one side of the sample was less than 10 cm, a value obtained by the measurement for 5 points at intervals of 5 cm may be used.

The increase in the air permeation resistance was obtained by the following formula.

$$\text{The increase in the air permeation resistance} = (Y) - (X) \text{ sec}/100 \text{ cc Air}$$

Air permeation resistance (X) of the laminated polyethylene microporous membrane (sec/100 cc Air)

Air permeation resistance (Y) of the battery separator (sec/100 cc Air)

10. Shutdown Temperature

The air permeation resistance of the laminated polyethylene microporous membrane was measured by an Oken-type air-permeability tester (EGO-IT, manufactured by Asahi Seiko Co., Ltd) while the multi-layer polyolefin microporous membrane was heated at the rate of temperature increase of 5° C./min. The temperature at which the air permeation resistance reached the detection limit, $1 \times 10^5$ sec/100 cc Air, was recorded as the shutdown temperature (° C.).

11. Increase Rate in Air Permeation Resistance

From the data of temperature and air permeation resistance P of the laminated polyethylene microporous membrane with the thickness T1 (μm) obtained from the shutdown temperature measurement of Section 7 above, a correlation chart between temperature and air permeation resistance P for the temperature range of 30° C. to 105° C. was produced. From the chart, a slope Pa (sec/100 cc Air/° C.) was calculated using the least-squares method. The calculated Pa was normalized for the membrane thickness of 20 μm, using the formula: Pb=Pa/T1×20. Thereby the increase rate Pb (sec/100) cc Air/μm/° C.) of the air permeation resistance in the temperature range of 30° C. to 105° C. was obtained.

12. Porosity of the Laminated Polyolefin Microporous Membrane

A 10 cm-square sample was prepared, and the sample volume (cm³) and the mass (g) thereof were measured. The porosity (%) was calculated from the obtained results using the following formula.

$$\text{Porosity} = (1 - \text{mass}/(\text{resin density} \times \text{sample volume})) \times 100$$

13. Weight Average Molecular Weight (Mw) and Molecular Weight Distribution (Mw/Mn)

Mw and Mw/Mn were determined by gel permeation chromatography (GPC) under the following measurement conditions.

Measurement apparatus: GPC-150C, manufactured by Waters Corporation

Column: "Shodex" (trade mark) UT806M, manufactured by Showa Denko, K. K.

Column temperature: 135° C.
Solvent (mobile phase): o-dichlorobenzene
Solvent flow rate: 1.0 ml/min
Sample Concentration: 0.1 mass % (dissolution condition: 135° C./1 h)
Injection quantity: 500 μl
Detector: differential refractometer manufactured by Waters Corporation.
Calibration curve: Created using predetermined conversion constant from calibration curve obtained using monodisperse polystyrene standard sample 14. Melt Flow Rate (MFR)

The measurement was done according to JIS-K7210, under the temperature of 190° C. and the load of 2.16 g.

15. Melting Point

Using the differential scanning calorimetry (DSC), DSC6220 manufactured by SII NanoTechnology Corp., a resin sample of 5 mg was subjected to the temperature increase at the rate of temperature increase of 20° C./min under nitrogen atmosphere, and an apex of the melting peak observed during the temperature increase was determined as a melting point.

Production of Coating Solution

Reference Example 1

A polyvinyl alcohol (average degree of polymerization: 1700, degree of saponification: not less than 99%) serving as a binder, alumina particles having an average particle size of 0.5 μm serving as inorganic particles, and ion-exchanged water were compounded at a weight ratio of 6:54:40, sufficiently stirred, and uniformly dispersed. Next, the solution was filtered with a filter having a filtration limit of 5 μm to obtain a coating solution (a).

Reference Example 2

A copolymer of a polyvinyl alcohol, acrylic acid, and methyl methacrylate ("POVACOAT" (trade mark), manufactured by Nissin Kasei Co., Ltd.) serving as a binder, alumina particles having an average particle size of 0.5 μm serving as inorganic particles, and a solvent (ion-exchanged water:ethanol=70:30) were compounded at a weight ratio of 5:45:50, sufficiently stirred, and uniformly dispersed. Next, the solution was filtered with a filter having a filtration limit of 5 μm to obtain a coating solution (b).

Reference Example 3

An aqueous emulsion of a polyvinylidene fluoride resin (VINYCOAT PVDF AQ360, manufactured by Higashi Nippon Toryo Co., Ltd.) serving as a binder, alumina particles having an average particle size of 0.5 μm serving as inorganic particles, and ion-exchanged water were compounded at a weight ratio of 30:30:40, sufficiently stirred, and uniformly dispersed. Next, the solution was filtered with a filter having a filtration limit of 5 μm to obtain a coating solution (c).

Production of Laminated Polyolefin Microporous Membrane

Example 1

A first polyethylene composition (melting point: 135° C.) was obtained by adding 0.375 mass % of tetrakis-[methylene-3-(3',5'-di-tert-butyl-4'-hydroxyphenyl) propionate] methane as an antioxidant to 100 mass % of a composition comprising 18 mass % of an ultrahigh molecular weight polyethylene (UHMWPE) having a weight average molecular weight of 2000000 and 82 mass % of a high-density polyethylene (HDPE) having a weight average molecular weight of 350000. Next, 25 mass % of this first polyethylene composition was introduced into a twin-screw extruder. Next, 75 mass % of liquid paraffin was fed through the side-feeder of the twin-screw extruder and melt-kneaded to prepare a first polyethylene resin solution inside the extruder.

On the other hand, a second polyethylene composition (melting point: 128° C.) was obtained by adding 0.375 mass % of an antioxidant (tetrakis-[methylene-3-(3',5'-di-tert-butyl-4'-hydroxyphenyl) propionate]methane) to 100 mass % of a composition comprising 17.5 mass % of an ultrahigh molecular weight polyethylene (UHMWPE) having a weight average molecular weight of 2000000, 57.5 mass % of a high-density polyethylene (HDPE) having a weight average molecular weight of 300000, and 25 mass % of a straight-chain low-density polyethylene (ethylene/1-hexene copolymer) having an MFR of 135 g/10 min and a melting point of 124° C. Next, 25 mass' of this second polyethylene composition was introduced into a twin-screw extruder. Next, 75 mass % of liquid paraffin was fed through the side-feeder of the twin-screw extruder and melt-kneaded to prepare a second polyethylene resin solution inside the extruder.

The obtained first and second polyethylene resin solutions were coextruded from a laminating die at 190° C. so that the layer structure was first/second/first and the solution ratio was 1/2/1. The extrudate was taken up on a cooling roller with a diameter of 800 mm, the inner cooling water temperature of which was kept at 25° C., to form an unstretched gel-like sheet.

The obtained unstretched gel-like sheet was passed through four preheating rollers to set the temperature of the sheet surface to 110° C., and the sheet was guided to the longitudinal stretching device A illustrated in FIG. 1. A metal roller (surface roughness: 0.5 S) with hard chromium plating having a width of 1000 mm and a diameter of 3000 mm was used as a longitudinal stretching roller. The surface temperature of each longitudinal stretching roller was 110° C. A polyester doctor blade was used as a doctor blade. In addition, a roller covered with a nitrile rubber (manufactured by Katsura Roller Mfg. Co., Ltd.) was used as a nip roller. Using the longitudinal stretching device A as a longitudinal stretching device, the peripheral speeds of the stretching rollers were increased in a stepwise manner in the downstream transport direction so that the peripheral speed ratio of the first and second stretching rollers was set to 1.3, the peripheral speed ratio of the second and third stretching rollers was set to 1.5, the peripheral speed ratio of the third and fourth stretching rollers was set to 1.8, and the peripheral speed ratio of the fourth and fifth stretching rollers was set to 2.1. In addition, the spacing between neighboring stretching rollers was set so that the distance from the point where the gel-like sheet being stretched moves away from a stretching roller to the point where the sheet comes into contact with the next stretching roller is 200 mm, and the pressure of each nip roller was set to 0.3 MPa. Further, the variation range of the surface temperature of each stretching roller was controlled to ±2° C. Next, the sheet was passed through four cooling rollers so as to cool the sheet to a sheet temperature of 50° C., and a longitudinally stretched gel-like sheet was thereby formed.

Both ends of the obtained longitudinally stretched gel-like sheet were held with clips, and the sheet was stretched by six times in the transverse direction at a temperature of 115° C. in a tenter divided into 20 zones, and a biaxially stretched gel-like sheet was formed. At this time, the spacing of the clips with respect to the transport direction of the sheet was set to 5 mm from the entrance of the tenter to the exit. The obtained biaxially stretched gel-like sheet was cooled to 30° C., and after liquid paraffin was removed in a washing tank of methylene chloride adjusted to a temperature of 25° C., the sheet was dried in a drying furnace adjusted to 60° C.

Figure 4:
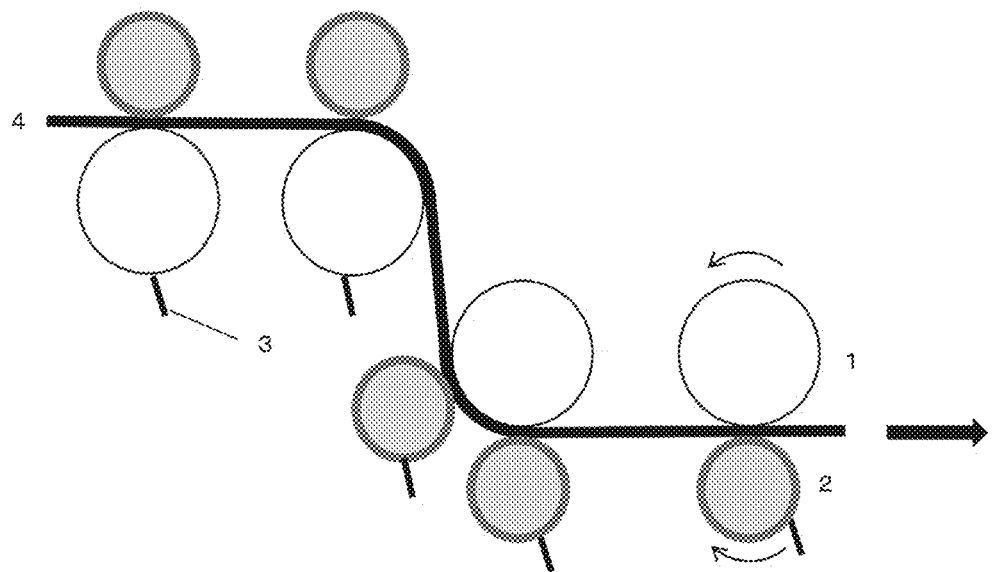
FIG. 4 is a schematic diagram illustrating a longitudinal stretching device D used in sequential biaxial stretching.

The dried sheet that was obtained was restretched to a longitudinal ratio of 1.2 times by the restretching device illustrated in FIG. 4 and heat-treated for 20 seconds at 125° C. to obtain a laminated polyolefin microporous membrane having a thickness of 14 µm. Further, the transporting speed at the time of winding was set to 50 m/min to obtain a roll of the laminated polyolefin microporous membrane with a width of 4000 mm and a roll length of 5050 m. The laminated polyolefin microporous membrane was drawn from the obtained roll and subjected to slit processing to a width of 950 mm to obtain a laminated polyolefin microporous membrane A to be used as a base material for coating.

Example 2

A laminated polyolefin microporous membrane B was obtained in the same manner as in Example 1 with the exception that the compounding ratio of ultrahigh molecular weight polyethylene (UHMWPE) and the high-density polyethylene (HDPE) in the first polyethylene composition was adjusted as shown in Table 1.

Example 3

Figure 2:
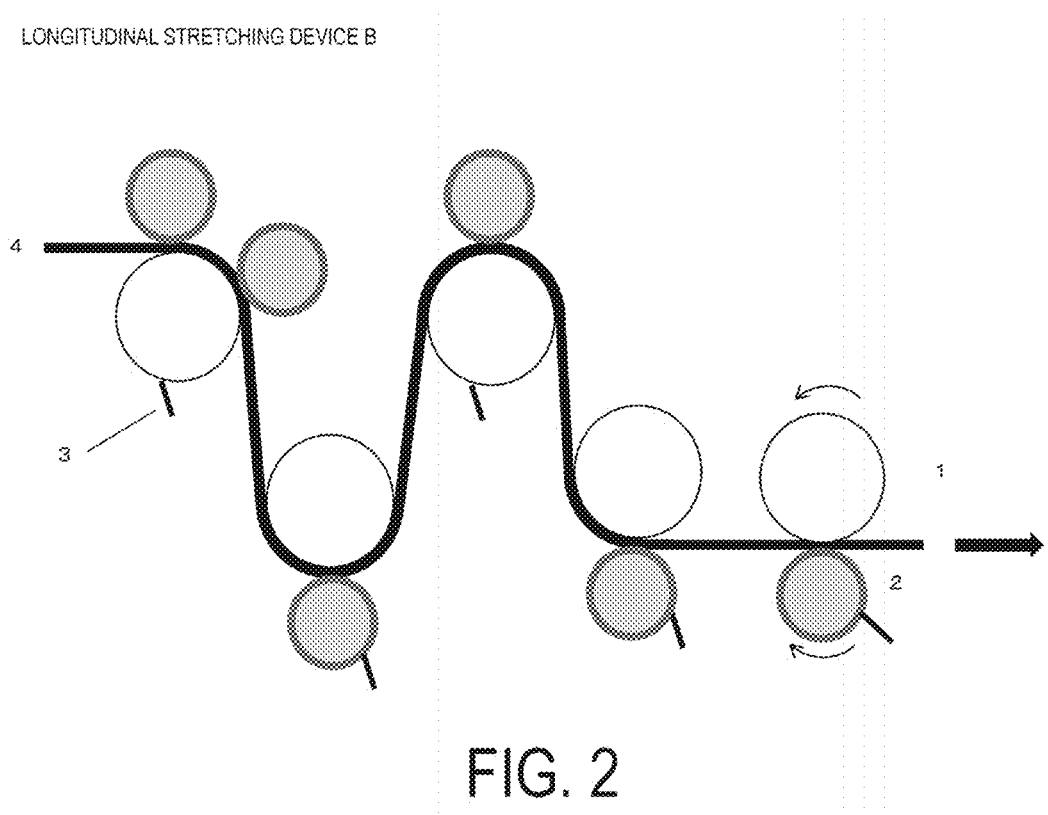
FIG. 2 is a schematic diagram illustrating a longitudinal stretching device B used in sequential biaxial stretching.

A laminated polyolefin microporous membrane C was obtained in the same manner as in Example 2 with the exception that the longitudinal stretching device B illustrated in FIG. 2 was used as a longitudinal stretching device instead of the longitudinal stretching device A.

Example 4

Figure 3:
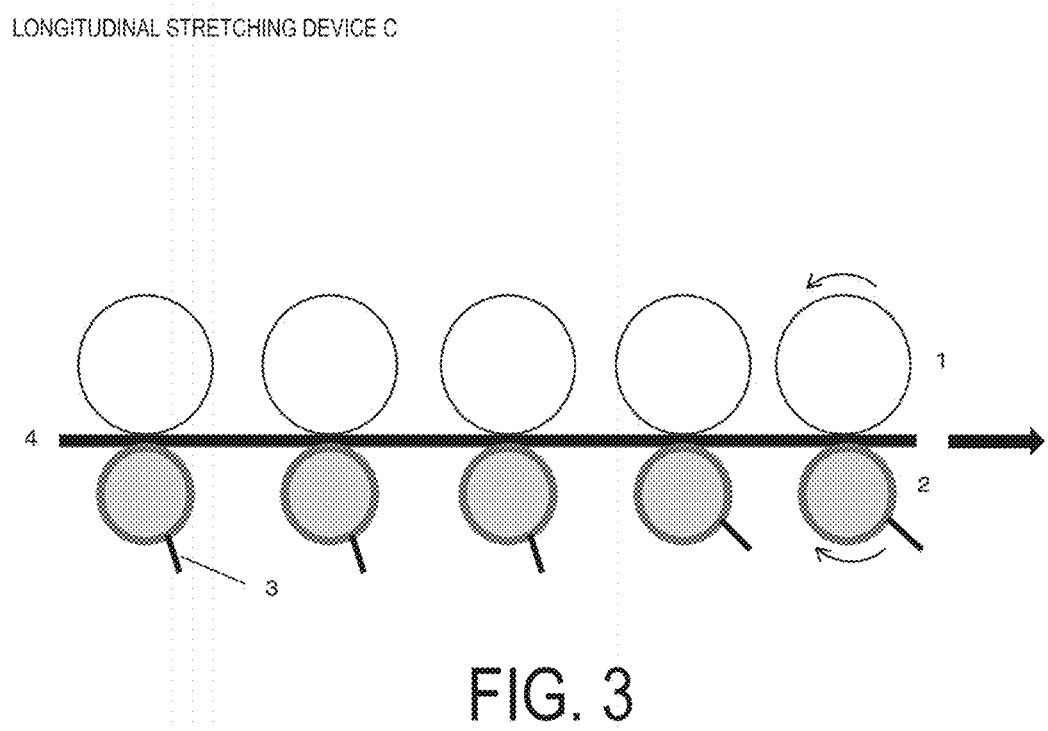
FIG. 3 is a schematic diagram illustrating a longitudinal stretching device C used in sequential biaxial stretching.

A laminated polyolefin microporous membrane D was obtained in the same manner as in Example 2 with the exception that the longitudinal stretching device C illustrated in FIG. 3 was used as a longitudinal stretching device instead of the longitudinal stretching device A.

Example 5

A laminated polyolefin microporous membrane E was obtained in the same manner as in Example 2 with the exception that the longitudinal stretching device D illustrated in FIG. 4 was used as a longitudinal stretching device instead of the longitudinal stretching device A and that the peripheral speed ratio of the first and second rollers of the longitudinal stretching device D was set to 1.5, the peripheral speed ratio of the second and third rollers was set to 2.0, and the peripheral speed ratio of the third and fourth rollers was set to 2.5.

Example 6

A laminated polyolefin microporous membrane F was obtained in the same manner as in Example 2 with the exception that the pressure of each nip roller was set to 0.1 MPa in the longitudinal stretching device.

Example 7

A laminated polyolefin microporous membrane G was obtained in the same manner as in Example 2 with the exception that the pressure of each nip roller was set to 0.5 MPa in the longitudinal stretching device.

Example 8

A laminated polyolefin microporous membrane H having a thickness of 7 µm was obtained in the same manner as in Example 2 after the extruded amount of each polyethylene resin solution was adjusted.

Example 9

A laminated polyolefin microporous membrane 1 was obtained in the same manner as in Example 2 with the exception that ceramic-coated metal rollers having a surface roughness of 5.0 S were used for the five longitudinal stretching rollers in the longitudinal stretching device A.

Example 10

A laminated polyolefin microporous membrane J was obtained in the same manner as in Example 2 with the exception that the peripheral speed ratio of the first and second rollers of the longitudinal stretching device A was set to 1.2, the peripheral speed ratio of the second and third rollers was set to 1.5, the peripheral speed ratio of the third and fourth rollers was set to 1.8, and the peripheral speed ratio of the fourth and fifth rollers was set to 2.3.

Example 11

A laminated polyolefin microporous membrane K was obtained in the same manner as in Example 2 with the exception that the peripheral speed ratio of the first and second rollers of the longitudinal stretching device A was set to 1.3, the peripheral speed ratio of the second and third rollers was set to 1.7, the peripheral speed ratio of the third and fourth rollers was set to 1.8, and the peripheral speed ratio of the fourth and fifth rollers was set to 1.9.

Examples 12 to 15

Laminated polyolefin microporous membranes L, M, N, and O were obtained in the same manner as in Example 2 with the exception that the low-melting-point resins contained in the second polyethylene composition were changed as described in Table 1.

Example 16

A laminated polyolefin microporous membrane P was obtained in the same manner as in Example 2 with the exception that the added amount of the low-melting-point resin contained in the second polyethylene composition was adjusted as shown in Table 1.

Example 17

A laminated polyolefin microporous membrane Q was obtained in the same manner as in Example 2 with the exception that the layer structure was first/second/first and the solution ratio was 1.5/2/1.5.

Example 18

A laminated polyolefin microporous membrane R was obtained in the same manner as in Example 2 with the exception that the compounding ratio of ultrahigh molecular weight polyethylene (UHMWPE) and the high density polyethylene (HDPE) in the first polyethylene composition was adjusted as shown in Table 1.

Comparative Example 1

A simultaneously biaxially stretched gel-like sheet was molded by holding both ends of the unstretched gel-like sheet that was molded in Example 2 with clips, guiding the sheet into a tenter divided into five zones regulated to a temperature of 116° C., and stretching the sheet by 7 times in the longitudinal direction and 7 times in the transverse direction using a simultaneous biaxial stretching method. At this time, the spacing of the clips was 5 mm at the tenter entrance and 95 mm at the tenter exit with respect to the transporting direction of the sheet. Next, the simultaneously biaxially stretched gel-like sheet was cooled to 30° C., and after liquid paraffin was removed by washing in a washing tank of methylene chloride adjusted to a temperature of 25° C., the sheet was dried in a drying furnace adjusted to 60° C. to obtain a laminated polyolefin microporous membrane. Further, the transporting speed at the time of winding was set to 50 m/min to obtain a roll of the laminated polyolefin microporous membrane with a width of 4000 mm and a roll length of 5050 m. The laminated polyolefin microporous membrane was drawn from the obtained roll and subjected to slit processing to a width of 950 mm to obtain a laminated polyolefin microporous membrane a to be used as a base material for coating.

Comparative Example 2

A laminated polyolefin microporous membrane b was obtained in the same manner as in Example 2 with the exception that nip rollers were not used for any of the five longitudinal stretching rollers in the longitudinal stretching device A.

Comparative Example 3

A laminated polyolefin microporous membrane c was obtained in the same manner as in Example 2 with the exception that the longitudinal stretching device B was used as a longitudinal stretching device and that nip rollers were not used for any of the five longitudinal stretching rollers.

Comparative Example 4

A laminated polyolefin microporous membrane d was obtained in the same manner as in Example 2 with the exception that the pressure of each nip roller was set to 0.04 MPa in the longitudinal stretching device A.

Comparative Example 5

A laminated polyolefin microporous membrane e was obtained in the same manner as in Example 2 with the exception that hard chromium-plated metal rollers having a surface roughness of 0.1 S were used for the longitudinal stretching rollers in the longitudinal stretching device A.

Comparative Example 6

A laminated polyolefin microporous membrane f was obtained in the same manner as in Example 2 with the exception that the peripheral speed ratio of the first and second rollers of the longitudinal stretching device A was set to 1.6, the peripheral speed ratio of the second and third rollers was set to 1.6, the peripheral speed ratio of the third and fourth rollers was set to 1.7, and the peripheral speed ratio of the fourth and fifth rollers was set to 1.7.

Comparative Example 7

A laminated polyolefin microporous membrane g was obtained in the same manner as in Example 2 with the exception that the peripheral speed ratio of the first and second rollers of the longitudinal stretching device A was set to 1.1, the peripheral speed ratio of the second and third rollers was set to 1.3, the peripheral speed ratio of the third and fourth rollers was set to 1.5, and the peripheral speed ratio of the fourth and fifth rollers was set to 3.5.

Comparative Example 8

A laminated polyolefin microporous membrane h was obtained in the same manner as in Example 2 with the exception that the peripheral speed ratio of the first and second rollers of the longitudinal stretching device A was set to 1.3, the peripheral speed ratio of the second and third rollers was set to 1.7, the peripheral speed ratio of the third and fourth rollers was set to 1.8, and the peripheral speed ratio of the fourth and fifth rollers was set to 1.9.

Comparative Example 9

A polyolefin microporous membrane i was obtained in the same manner as in Example 2 with the exception that only the polyethylene solution A was used and extruded from a monolayer die at 190° C. to form a gel-like sheet, and the obtained monolayer gel-like sheet was used.

Comparative Example 10

A laminated polyolefin microporous membrane j was obtained in the same manner as in Example 2 with the exception that an ethylene/1-hexene copolymer having an MFR of 3.2 g/10 min was used as the low-melting-point resin contained in the second polyethylene composition.

Comparative Example 11

A laminated polyolefin microporous membrane k was obtained in the same manner as in Example 2 with the exception that the compounding ratio of the ultrahigh molecular weight polyethylene (UHMWPE) and the high-density polyethylene (HDPE) in the first polyethylene composition was adjusted as shown in Table 1.

Example 19

A battery separator was obtained by applying a coating solution (a) to the laminated polyolefin microporous membrane A obtained in Example 1 at a transporting speed of 50 m/min using the coating device (gravure coating method)

illustrated in FIG. 5 and passing the membrane through a hot-air drier for 10 seconds at 50° C. so as to dry the membrane. At this time, the positions of the coating roller and the backing roller of the coating device were adjusted so that the thickness of the coating contact line was within the range of from 3 to 5 mm. In addition, a gravure roller having a diameter of 100 mm and an eccentricity tolerance of 8 μm/Φ100 mm was used as a coating roller. Next, slit processing was performed to obtain a battery separator having a thickness of 17 μm, a width of 900 mm, and a winding length of 5000 m.

Examples 20 to 36

Battery separators were obtained in the same manner as in Example 19 with the exception that the laminated polyolefin microporous membranes B to R obtained in Examples 2 to 18 were used.

Example 37

A battery separator was obtained in the same manner as in Example 20 with the exception that the coating solution (a) was replaced with a coating solution (b).

Example 38

A battery separator was obtained in the same manner as in Example 20 with the exception that the coating solution (a) was replaced with a coating solution (c).

Example 39

A battery separator was obtained in the same manner as in Example 20 with the exception that a gravure roller having a diameter of 100 mm and an eccentricity tolerance of 10 μm/Φ100 mm was used as a coating roller.

Example 40

A battery separator was obtained in the same manner as in Example 20 with the exception that a gravure roller having a diameter of 100 mm and an eccentricity tolerance of 5 μm/Φ100 mm was used as a coating roller.

Example 41

A battery separator was obtained in the same manner as in Example 20 with the exception that the positions of the gravure roller and the backing roller of the coating device were adjusted and that the thickness of the coating contact line was set to within the range of from 5 to 7 mm.

Example 42

A battery separator was obtained in the same manner as in Example 20 with the exception that the positions of the gravure roller and the backing roller of the coating device were adjusted and that the thickness of the coating contact line was set to within the range of from 8 to 10 mm.

Example 43

A battery separator was obtained in the same manner as in Example 20 with the exception that the cell capacity of the gravure roller in the coating device was changed and that the thickness of the porous layer was set to 5 μm.

Example 44

A battery separator was obtained in the same manner as in Example 20 with the exception that the positions of the gravure roller and the backing roller of the coating device were adjusted and that the thickness of the coating contact line was set to within the range of from 11 to 13 mm.

Example 45

A battery separator was obtained in the same manner as in Example 20 with the exception that a gravure roller having a diameter of 100 mm and an eccentricity tolerance of 12 μm/Φ100 mm was used as a coating roller.

Example 46

A battery separator was obtained in the same manner as in Example 20 with the exception that the cell capacity of the gravure roller in the coating device was changed so that the thickness of the porous layer was 8 μm.

Comparative Examples 12 to 22

Battery separators were obtained in the same manner as in Example 19 with the exception that the laminated polyolefin microporous membranes a to k obtained in Comparative Examples 1 to 11 were used.

The production conditions of the laminated polyolefin microporous membranes of Examples 1 to 18 and Comparative Examples 1 to 11 are shown in Table 1.

The production conditions, the characteristics of the battery separators, and the characteristics of the rolls thereof are shown in Table 3 for Examples 19 to 46 and in Table 4 for Comparative Examples 12 to 22.

TABLE 1

| | First polyolefin resin composition | | Second polyolefin resin composition | | | | | |
|---|---|---|---|---|---|---|---|---|
| | UHMWPE | HDPE | UHMWPE | HDPE | Low-melting point resin | | | |
| | Amount Added (wt. %) | Amount Added (wt. %) | Amount Added (wt. %) | Amount Added (wt. %) | Ingredient | Amount Added (wt. %) | Melting Point (° C.) | MFR (g/10 min) |
| Example 1 | 18 | 82 | 17.5 | 57.5 | Ethylene/ 1-hexene copolymer | 25 | 124 | 135 |
| Example 2 | 30 | 70 | 17.5 | 57.5 | Ethylene/ 1-hexene copolymer | 25 | 124 | 135 |

TABLE 1-continued

| | | | | | | | | |
|---|---|---|---|---|---|---|---|---|
| Example 3 | 30 | 70 | 17.5 | 57.5 | Ethylene/1-hexene copolymer | 25 | 124 | 135 |
| Example 4 | 30 | 70 | 17.5 | 57.5 | Ethylene/1-hexene copolymer | 25 | 124 | 135 |
| Example 5 | 30 | 70 | 17.5 | 57.5 | Ethylene/1-hexene copolymer | 25 | 124 | 135 |
| Example 6 | 30 | 70 | 17.5 | 57.5 | Ethylene/1-hexene copolymer | 25 | 124 | 135 |
| Example 7 | 30 | 70 | 17.5 | 57.5 | Ethylene/1-hexene copolymer | 25 | 124 | 135 |
| Example 8 | 30 | 70 | 17.5 | 57.5 | Ethylene/1-hexene copolymer | 25 | 124 | 135 |
| Example 9 | 30 | 70 | 17.5 | 57.5 | Ethylene/1-hexene copolymer | 25 | 124 | 135 |
| Example 10 | 30 | 70 | 17.5 | 57.5 | Ethylene/1-hexene copolymer | 25 | 124 | 135 |
| Example 11 | 30 | 70 | 17.5 | 57.5 | Ethylene/1-hexene copolymer | 25 | 124 | 135 |
| Example 12 | 30 | 70 | 17.5 | 57.5 | Ethylene/1-butene copolymer | 25 | 121 | 55 |
| Example 13 | 30 | 70 | 17.5 | 57.5 | Low Density Polyethylene | 25 | 122 | 28 |
| Example 14 | 30 | 70 | 17.5 | 57.5 | Ethylene/1-hexene copolymer | 25 | 123 | 50 |
| Example 15 | 30 | 70 | 17.5 | 57.5 | Ethylene/1-octene copolymer | 25 | 125 | 136 |
| Example 16 | 30 | 70 | 17.5 | 55.0 | Ethylene/1-hexene copolymer | 27.5 | 124 | 135 |
| Example 17 | 30 | 70 | 17.5 | 57.5 | Ethylene/1-hexene copolymer | 25 | 124 | 135 |
| Example 18 | 2 | 98 | 17.5 | 57.5 | Ethylene/1-hexene copolymer | 25 | 124 | 135 |

| | Layer Configuration | Layer thickness ratio | Stretching method | Stretching conditions | | | |
|---|---|---|---|---|---|---|---|
| | | | | Longitudinal stretching device | Surface roughness (S) | Peripheral speed ratio | Nip pressure (Mpa) |
| Example 1 | A/B/A | 1/2/1 | Sequential | A | 0.5 | 1.3/1.5/1.8/2.1 | 0.3 |
| Example 2 | A/B/A | 1/2/1 | Sequential | A | 0.5 | 1.3/1.5/1.8/2.1 | 0.3 |
| Example 3 | A/B/A | 1/2/1 | Sequential | B | 0.5 | 1.3/1.5/1.8/2.1 | 0.3 |
| Example 4 | A/B/A | 1/2/1 | Sequential | C | 0.5 | 1.3/1.5/1.8/2.1 | 0.3 |
| Example 5 | A/B/A | 1/2/1 | Sequential | D | 0.5 | 1.5/2.0/2.5 | 0.3 |
| Example 6 | A/B/A | 1/2/1 | Sequential | A | 0.5 | 1.3/1.5/1.8/2.1 | 0.1 |
| Example 7 | A/B/A | 1/2/1 | Sequential | A | 0.5 | 1.3/1.5/1.8/2.1 | 0.5 |
| Example 8 | A/B/A | 1/2/1 | Sequential | A | 0.5 | 1.3/1.5/1.8/2.1 | 0.3 |
| Example 9 | A/B/A | 1/2/1 | Sequential | A | 5.0 | 1.3/1.5/1.8/2.1 | 0.3 |
| Example 10 | A/B/A | 1/2/1 | Sequential | A | 0.5 | 1.2/1.5/1.8/2.3 | 0.3 |
| Example 11 | A/B/A | 1/2/1 | Sequential | A | 0.5 | 1.3/1.7/1.8/1.9 | 0.3 |
| Example 12 | A/B/A | 1/2/1 | Sequential | A | 0.5 | 1.3/1.5/1.8/2.1 | 0.3 |
| Example 13 | A/B/A | 1/2/1 | Sequential | A | 0.5 | 1.3/1.5/1.8/2.1 | 0.3 |

TABLE 1-continued

| | | | | | | | | |
|---|---|---|---|---|---|---|---|---|
| Example 14 | A/B/A | 1/2/1 | Sequential | A | 0.5 | 1.3/1.5/1.8/2.1 | 0.3 |
| Example 15 | A/B/A | 1/2/1 | Sequential | A | 0.5 | 1.3/1.5/1.8/2.1 | 0.3 |
| Example 16 | A/B/A | 1/2/1 | Sequential | A | 0.5 | 1.3/1.5/1.8/2.1 | 0.3 |
| Example 17 | A/B/A | 1.5/2/1.5 | Sequential | A | 0.5 | 1.3/1.5/1.8/2.1 | 0.3 |
| Example 18 | A/B/A | 1/2/1 | Sequential | A | 0.5 | 1.3/1.5/1.8/2.1 | 0.3 |

TABLE 2

| | First polyolefin resin composition | | Second polyolefin resin composition | | | | | |
|---|---|---|---|---|---|---|---|---|
| | UHMWPE | HDPE | UHMWPE | HDPE | Low-melting point resin | | | |
| | Amount Added (wt. %) | Amount Added (wt. %) | Amount Added (wt. %) | Amount Added (wt. %) | Ingredient | Amount Added (wt. %) | Melting Point (° C.) | MFR (g/10 min) |
| Comparative Example 1 | 30 | 70 | 17.5 | 57.5 | Ethylene/1-hexene copolymer | 25 | 124 | 135 |
| Comparative Example 2 | 30 | 70 | 17.5 | 57.5 | Ethylene/1-hexene copolymer | 25 | 124 | 135 |
| Comparative Example 3 | 30 | 70 | 17.5 | 57.5 | Ethylene/1-hexene copolymer | 25 | 124 | 135 |
| Comparative Example 4 | 30 | 70 | 17.5 | 57.5 | Ethylene/1-hexene copolymer | 25 | 124 | 135 |
| Comparative Example 5 | 30 | 70 | 17.5 | 57.5 | Ethylene/1-hexene copolymer | 25 | 124 | 135 |
| Comparative Example 6 | 30 | 70 | 17.5 | 57.5 | Ethylene/1-hexene copolymer | 25 | 124 | 135 |
| Comparative Example 7 | 30 | 70 | 17.5 | 57.5 | Ethylene/1-hexene copolymer | 25 | 124 | 135 |
| Comparative Example 8 | 30 | 70 | 17.5 | 57.5 | Ethylene/1-hexene copolymer | 25 | 124 | 135 |
| Comparative Example 9 | 30 | 70 | — | — | — | — | — | — |
| Comparative Example 10 | 30 | 70 | 17.5 | 57.5 | Ethylene/1-hexene copolymer | 25 | 123 | 3.2 |
| Comparative Example 11 | 0 | 100 | 17.5 | 57.5 | Ethylene/1-hexene copolymer | 25 | 124 | 135 |

| | | | Stretching conditions | | | |
|---|---|---|---|---|---|---|
| | Layer Configuration | Layer thickness ratio | Stretching method | Longitudinal stretching device | Surface roughness (S) | Peripheral speed ratio | Nip pressure (Mpa) |
| Comparative Example 1 | A/B/A | 1/2/1 | Simultaneous | — | — | — | — |
| Comparative Example 2 | A/B/A | 1/2/1 | Sequential | A | 0.5 | 1.3/1.5/1.8/2.1 | — |
| Comparative Example 3 | A/B/A | 1/2/1 | Sequential | B | 0.5 | 1.3/1.5/1.8/2.1 | — |
| Comparative Example 4 | A/B/A | 1/2/1 | Sequential | A | 0.5 | 1.3/1.5/1.8/2.1 | 0.04 |
| Comparative Example 5 | A/B/A | 1/2/1 | Sequential | A | 0.1 | 1.3/1.5/1.8/2.1 | 0.3 |
| Comparative Example 6 | A/B/A | 1/2/1 | Sequential | A | 0.5 | 1.6/1.6/1.7/1.7 | 0.3 |
| Comparative Example 7 | A/B/A | 1/2/1 | Sequential | A | 0.5 | 1.4/4.3/4.5/3.5 | 0.3 |
| Comparative Example 8 | A/B/A | 1/2/1 | Sequential | A | 0.5 | 1.3/1.7/1.8/1.9 | 0.3 |

TABLE 2-continued

|  |  |  |  |  |  |  |  |
|---|---|---|---|---|---|---|---|
| Comparative Example 9 | A | — | Sequential | A | 0.5 | 1.3/1.5/1.8/2.1 | 0.3 |
| Comparative Example 10 | A/B/A | 1/2/1 | Sequential | A | 0.5 | 1.3/1.5/1.8/2.1 | 0.3 |
| Comparative Example 11 | A/B/A | 1/2/1 | Sequential | A | 0.5 | 1.3/4.5/4.8/2.4 | 0.3 |

TABLE 3

| | Physical properties of the laminated polyolefin microporous membrane | | | | Coating conditions | |
|---|---|---|---|---|---|---|
| | Laminated polyolefin microporous membrane | Thickness (μm) | Air permeation resistance (sec/100 cc Air) | Variation range in the F25 value (MPa) | Coating solution | Thickness of the coating contact line (mm) | Eccentricity tolerance of the coating roller (μm/Φ 100 mm) |

| | Laminated polyolefin microporous membrane | Thickness (μm) | Air permeation resistance (sec/100 cc Air) | Variation range in the F25 value (MPa) | Coating solution | Thickness of the coating contact line (mm) | Eccentricity tolerance of the coating roller (μm/Φ 100 mm) |
|---|---|---|---|---|---|---|---|
| Example 19 | A | 14 | 195 | 0.6 | a | 3 to 5 | 8 |
| Example 20 | B | 14 | 169 | 0.6 | a | 3 to 5 | 8 |
| Example 21 | C | 14 | 169 | 0.5 | a | 3 to 5 | 8 |
| Example 22 | D | 14 | 169 | 0.7 | a | 3 to 5 | 8 |
| Example 23 | E | 14 | 169 | 0.8 | a | 3 to 5 | 8 |
| Example 24 | F | 14 | 169 | 0.9 | a | 3 to 5 | 8 |
| Example 25 | G | 14 | 169 | 0.4 | a | 3 to 5 | 8 |
| Example 26 | H | 7 | 111 | 0.7 | a | 3 to 5 | 8 |
| Example 27 | I | 14 | 169 | 0.4 | a | 3 to 5 | 8 |
| Example 28 | J | 14 | 169 | 0.5 | a | 3 to 5 | 8 |
| Example 29 | K | 14 | 169 | 0.7 | a | 3 to 5 | 8 |
| Example 30 | L | 14 | 169 | 0.6 | a | 3 to 5 | 8 |
| Example 31 | M | 14 | 195 | 0.6 | a | 3 to 5 | 8 |
| Example 32 | N | 14 | 176 | 0.6 | a | 3 to 5 | 8 |
| Example 33 | O | 14 | 164 | 0.6 | a | 3 to 5 | 8 |
| Example 34 | P | 14 | 168 | 0.6 | a | 3 to 5 | 8 |
| Example 35 | Q | 14 | 169 | 0.6 | a | 3 to 5 | 8 |
| Example 36 | R | 14 | 152 | 0.6 | a | 3 to 5 | 8 |
| Example 37 | B | 14 | 169 | 0.6 | b | 3 to 5 | 8 |
| Example 38 | B | 14 | 169 | 0.6 | c | 3 to 5 | 8 |
| Example 39 | B | 14 | 169 | 0.6 | a | 3 to 5 | 10 |
| Example 40 | B | 14 | 169 | 0.6 | a | 3 to 5 | 5 |
| Example 41 | B | 14 | 169 | 0.6 | a | 5 to 7 | 8 |
| Example 42 | B | 14 | 169 | 0.6 | a | 8 to 10 | 8 |
| Example 43 | B | 14 | 169 | 0.6 | a | 3 to 5 | 8 |
| Example 44 | B | 14 | 169 | 0.6 | a | 11 to 13 | 8 |
| Example 45 | B | 14 | 169 | 0.6 | a | 3 to 6 | 12 |
| Example 46 | B | 14 | 169 | 0.6 | a | 3 to 5 | 8 |

| | Physical properties of the battery separator | | | | |
|---|---|---|---|---|---|
| | Thickness (μm) | Increase Rate in Air Permeation Resistance (sec/100 cc Air/° C./20 μm) | Shutdown temperature (° C.) | Variation range in thickness in the longitudinal direction of the porous layer (μm) | Winding appearance | Scratching |
| Example 19 | 17 | 0.8 | 130 | 0.5 | Excellent | Excellent |
| Example 20 | 17 | 0.9 | 128 | 0.5 | Excellent | Excellent |
| Example 21 | 17 | 0.9 | 128 | 0.4 | Excellent | Excellent |
| Example 22 | 17 | 0.9 | 128 | 0.6 | Excellent | Excellent |
| Example 23 | 17 | 0.9 | 128 | 0.9 | Excellent | Excellent |
| Example 24 | 17 | 0.9 | 128 | 1.0 | Excellent | Excellent |
| Example 25 | 17 | 0.9 | 128 | 0.3 | Excellent | Excellent |
| Example 26 | 10 | 0.9 | 128 | 0.8 | Excellent | Excellent |
| Example 27 | 17 | 0.9 | 128 | 0.3 | Excellent | Excellent |
| Example 28 | 17 | 0.9 | 128 | 0.4 | Excellent | Excellent |
| Example 29 | 17 | 0.9 | 128 | 0.8 | Excellent | Excellent |
| Example 30 | 17 | 1.4 | 128 | 0.5 | Excellent | Excellent |
| Example 31 | 17 | 1.5 | 128 | 0.5 | Excellent | Excellent |
| Example 32 | 17 | 1.4 | 129 | 0.5 | Excellent | Excellent |
| Example 33 | 17 | 0.9 | 131 | 0.5 | Excellent | Excellent |
| Example 34 | 17 | 0.9 | 132 | 0.5 | Excellent | Excellent |
| Example 35 | 17 | 0.9 | 128 | 0.5 | Excellent | Excellent |
| Example 36 | 17 | 1.0 | 128 | 0.5 | Excellent | Excellent |
| Example 37 | 17 | 0.9 | 128 | 0.5 | Excellent | Excellent |

TABLE 3-continued

| | | | | | | |
|---|---|---|---|---|---|---|
| Example 38 | 17 | 0.9 | 128 | 0.5 | Excellent | Excellent |
| Example 39 | 17 | 0.9 | 128 | 0.7 | Excellent | Excellent |
| Example 40 | 17 | 0.9 | 128 | 0.4 | Excellent | Excellent |
| Example 41 | 17 | 0.9 | 128 | 0.5 | Excellent | Excellent |
| Example 42 | 17 | 0.9 | 128 | 0.5 | Excellent | Excellent |
| Example 43 | 19 | 0.9 | 128 | 0.7 | Excellent | Excellent |
| Example 44 | 17 | 0.9 | 128 | 0.6 | Excellent | Good |
| Example 45 | 17 | 0.9 | 128 | 1.8 | Good | Excellent |
| Example 46 | 22 | 0.9 | 128 | 1.3 | Excellent | Excellent |

TABLE 4

| | Physical properties of the laminated polyolefin microporous membrane | | | | Coating conditions | | |
|---|---|---|---|---|---|---|---|
| | Laminated polyolefin microporous membrane | Thickness (μm) | Air permeation resistance (sec/100 cc Air) | Variation range in the F25 value (MPa) | Coating solution | Thickness of the coating contact line (mm) | Eccentricity tolerance of the coating roller (μm/Φ 100 mm) |
| Comparative Example 12 | a | 14 | 198 | 3.6 | a | 3 to 5 | 8 |
| Comparative Example 13 | b | 14 | 169 | 1.9 | a | 3 to 5 | 8 |
| Comparative Example 14 | c | 14 | 169 | 1.7 | a | 3 to 5 | 8 |
| Comparative Example 15 | d | 14 | 169 | 1.5 | a | 3 to 5 | 8 |
| Comparative Example 16 | e | 14 | 169 | 1.2 | a | 3 to 5 | 8 |
| Comparative Example 17 | f | 14 | 169 | 1.6 | a | 3 to 5 | 8 |
| Comparative Example 18 | g | 14 | 169 | 1.4 | a | 3 to 5 | 8 |
| Comparative Example 19 | h | 14 | 169 | 2.2 | a | 3 to 5 | 8 |
| Comparative Example 1 | i | 14 | 198 | 0.6 | a | 3 to 5 | 8 |
| Comparative Example 21 | j | 14 | 382 | 0.6 | a | 3 to 5 | 8 |
| Comparative Example 22 | k | 14 | 380 | 0.6 | a | 3 to 5 | 8 |

| | Physical properties of the battery separator | | | | | |
|---|---|---|---|---|---|---|
| | Membrane Thickness (μm) | Increase Rate in Air Permeation Resistance (sec/100 cc Air/° C./20 μm) | Shutdown temperature (° C.) | Variation range in thickness in the longitudinal direction of the porous layer (μm) | Winding appearance | Scratching |
| Comparative Example 12 | 17 | 1.1 | 137 | 2.1 | Fail | Excellent |
| Comparative Example 13 | 17 | 0.9 | 128 | 1.8 | Good | Excellent |
| Comparative Example 14 | 17 | 0.9 | 128 | 1.7 | Good | Excellent |
| Comparative Example 15 | 17 | 0.9 | 128 | 1.6 | Good | Excellent |
| Comparative Example 16 | 17 | 0.9 | 128 | 1.3 | Good | Excellent |
| Comparative Example 17 | 17 | 0.9 | 128 | 1.7 | Good | Excellent |
| Comparative Example 18 | 17 | 0.9 | 128 | 1.5 | Good | Excellent |
| Comparative Example 19 | 17 | 0.9 | 128 | 2.0 | Good | Excellent |
| Comparative Example 1 | 17 | 1.1 | 137 | 0.5 | Excellent | Excellent |
| Comparative Example 21 | 17 | 1.7 | 128 | 0.5 | Excellent | Excellent |
| Comparative Example 22 | 17 | 1.7 | 128 | 0.5 | Excellent | Excellent |

REFERENCE SIGNS LIST

1 Longitudinal stretching roller
2 Nip roller
3 Blade
4 Unstretched gel-like sheet
5 Biaxially stretched sheet
6 Longitudinal restretching roller
7 Nip roller for longitudinal restretching
8 Laminated polyolefin microporous membrane
9 Coating roller
10 Coating contact line
11 Backing roller
12 Roller position adjustment direction

The invention claimed is:

1. A laminated polyolefin microporous membrane, comprising:
   a first polyolefin microporous membrane, wherein the first polyolefin microporous membrane comprises not less than 80% mass polyethylene; and
   a second polyolefin microporous membrane, wherein the second polyolefin microporous membrane comprises not less than 50% mass high density polyethylene and between 20% and 35% mass low melting point resin, wherein the resin has a melting point of at least 120° C. and less than 130° C.,
   wherein:
      a shutdown temperature of the laminated polyolefin microporous membrane is from 128° C. to 135° C., wherein the shutdown temperature is the temperature at which air permeation resistance becomes greater than $1 \times 10^5$ sec/100 cc Air,
      the laminated polyolefin microporous membrane has a thickness between 5 and 25 µm,
      an air permeation resistance increase rate from 30° C. to 105° C. per 20 µm of thickness of the laminated polyolefin microporous membrane is less than 1.5 sec/100 cc Air/° C., and
      a variation range in an F25 value of the laminated polyolefin microporous membrane in a longitudinal direction is not greater than 1 MPa, wherein the F25 value represents a value determined by dividing the load at 25% elongation of a sample of the laminated polyolefin microporous membrane as measured with a tensile tester by the cross-sectional area of the sample polyolefin microporous membrane.

2. The laminated polyolefin microporous membrane according to claim 1, wherein the resin of the second polyolefin microporous membrane has a melt flow rate of from 25 g/10 min to 150 g/10 min.

3. A battery separator comprising:
   a laminated polyolefin microporous membrane, comprising:
      a first polyolefin microporous membrane, wherein the first polyolefin microporous membrane comprises not less than 80% mass polyethylene, and
      a second polyolefin microporous membrane, wherein the second polyolefin microporous membrane comprises not less than 50% mass high density polyethylene and between 20% and 35% mass low melting point resin, wherein the resin has a melting point of at least 120° C. and less than 130° C.,
   wherein:
      a shutdown temperature of the laminated polyolefin microporous membrane is from 128° C. to 135° C., wherein the shutdown temperature is the temperature at which air permeation resistance becomes greater than $1 \times 10^5$ sec/100 cc Air,
      the laminated polyolefin microporous membrane has a thickness between 5 and 25 µm,
      an air permeation resistance increase rate from 30° C. to 105° C. per 20 µm of thickness of the laminated polyolefin microporous membrane is less than 1.5 sec/100 cc Air/° C., and
      a variation range in an F25 value of the laminated polyolefin microporous membrane in a longitudinal direction is not greater than 1 MPa, wherein the F25 value represents a value determined by dividing the load at 25% elongation of a sample of the laminated polyolefin microporous membrane as measured with a tensile tester by the cross-sectional area of the sample polyolefin microporous membrane; and
   a porous layer on one or more sides of the laminated polyolefin microporous membrane, wherein the porous layer comprises a water-soluble resin or a water-dispersible resin and heat-resistant particles and has an average thickness T(ave) of from 1 µm to 5 µm.

4. The battery separator according to claim 3, wherein a variation range (R) in thickness in a longitudinal direction of the porous layer is not greater than 1.0 µm.

5. The battery separator according to claim 3, wherein the water-soluble resin or water-dispersible resin contains at least one type of resin selected from the group consisting of polyvinyl alcohol, acrylic resins, and polyvinylidene fluoride resins.

6. The battery separator according to claim 3, wherein a length of the laminated polyolefin microporous membrane is not less than 2000 m.

7. The battery separator according to claim 3, wherein a length of the laminated polyolefin microporous membrane is not less than 3000 m.

8. A method of manufacturing a laminated polyolefin microporous membrane, the method comprising:
   (a) preparing a first polyolefin solution by melt-kneading a membrane-forming solvent into a first polyolefin composition;
   (b) preparing a second polyolefin solution by melt-kneading a membrane-forming solvent into a second polyolefin composition;
   (c) forming an unstretched gel-like sheet by simultaneously extruding the first and second polyolefin solutions from a single die and cooling the first and second polyolefin solutions;
   (d) obtaining a longitudinally stretched gel-like sheet by passing the unstretched gel-like sheet between three or more pairs of longitudinal stretching rollers and increasing a peripheral speed between each of the rollers in a stepwise manner so as to stretch the sheet in a longitudinal direction,
      wherein each pair of longitudinal stretching rollers comprises a longitudinal stretching roller and a nip roller contacting the longitudinal stretching roller in parallel, and a contact pressure of the nip roller against the longitudinal stretching roller is not less than 0.05 MPa and not greater than 0.5 MPa;
   (e) obtaining a biaxially stretched gel-like sheet by holding the longitudinally stretched gel-like sheet with clips so that a distance between the clips is not more than 50 mm and stretching the sheet in the transverse direction;

(f) extracting the membrane-forming solvent from the biaxially stretched gel-like sheet and drying the biaxially stretched gel-like sheet;
(g) heat-treating the dried sheet to obtain the laminated polyolefin microporous membrane.

9. The method according to claim 8, wherein a peripheral speed ratio of neighboring longitudinal stretching rollers in step (d) increases in a stepwise manner.

10. The method of claim 8, further comprising winding the laminated polyolefin microporous membrane around a winding core at a transporting speed of not less than 50 m/min.

11. A method of manufacturing a battery separator, the method comprising:
providing a laminated polyolefin microporous membrane, comprising:
a first polyolefin microporous membrane, and
a second polyolefin microporous membrane,
wherein:
a shutdown temperature of the laminated polyolefin microporous membrane is from 128° C. to 135° C.,
an air permeation resistance increase rate from 30° C. to 105° C. per 20 μm of thickness of the laminated polyolefin microporous membrane is less than 1.5 sec/100 cc Air/° C., and
a variation range in an F25 value of the laminated polyolefin microporous membrane in a longitudinal direction is not greater than 1 MPa, wherein the F25 value represents a value determined by dividing the load at 25% elongation of a sample of the laminated polyolefin microporous membrane as measured with a tensile tester by the cross-sectional area of the sample polyolefin microporous membrane; and
applying a coating solution containing a water-soluble resin or a water-dispersible resin and heat-resistant particles to one or more sides of the laminated polyolefin microporous membrane with a roller coating method using a coating roller having an eccentricity tolerance not greater than 10 μm/Φ 100 mm.

12. The method according to claim 11, wherein the coating roller is a gravure roller.

* * * * *